United States Patent
Chen et al.

(10) Patent No.: US 12,362,880 B2
(45) Date of Patent: Jul. 15, 2025

(54) UPLINK CONTROL INFORMATION MULTIPLEXING TECHNIQUES FOR UPLINK COMMUNICATIONS USING MULTIPLE REPETITIONS

(71) Applicant: QUALCOMM Incorporated, San Diego, CA (US)

(72) Inventors: Yitao Chen, San Diego, CA (US); Mostafa Khoshnevisan, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 580 days.

(21) Appl. No.: 17/737,782

(22) Filed: May 5, 2022

(65) Prior Publication Data

US 2022/0360404 A1    Nov. 10, 2022

Related U.S. Application Data

(60) Provisional application No. 63/185,888, filed on May 7, 2021.

(51) Int. Cl.
*H04L 5/00*     (2006.01)
*H04W 72/20*    (2023.01)

(52) U.S. Cl.
CPC .......... *H04L 5/0051* (2013.01); *H04L 5/0053* (2013.01); *H04W 72/20* (2023.01)

(58) Field of Classification Search
None
See application file for complete search history.

(56) References Cited

U.S. PATENT DOCUMENTS

| | | | |
|---|---|---|---|
| 2019/0007182 A1* | 1/2019 | Li | H04L 1/007 |
| 2019/0149365 A1* | 5/2019 | Chatterjee | H04W 76/11 370/329 |
| 2021/0307070 A1* | 9/2021 | Kim | H04L 25/0226 |
| 2021/0345366 A1* | 11/2021 | Ying | H04W 72/1263 |
| 2021/0360610 A1* | 11/2021 | Kim | H04L 1/1858 |
| 2022/0132537 A1 | 4/2022 | Wang et al. | |
| 2022/0210806 A1* | 6/2022 | Rastegardoost | H04W 74/0833 |
| 2022/0353711 A1* | 11/2022 | Ying | H04W 72/1263 |
| 2023/0054490 A1* | 2/2023 | Wong | H04L 1/1664 |
| 2024/0284494 A1* | 8/2024 | Kim | H04L 1/1858 |

OTHER PUBLICATIONS

Apple, "Summary of [101-e-NR-L1 enh-URLLC-PUSCH] (AI 7.2.5.3)", Doc Code R1-2004741, dated Jun. 5, 2020 (Year: 2020).*

(Continued)

*Primary Examiner* — Jamaal Henson
(74) *Attorney, Agent, or Firm* — Holland & Hart / QUALCOMM Incorporated

(57) ABSTRACT

Methods, systems, and devices for wireless communications are described that provide for transmission of multiple repetitions of uplink control information (UCI) multiplexed with uplink data in which a spectral efficiency ratio of the uplink data to the UCI is scaled based on one or more parameters associated with the multiple repetitions. The one or more parameters may include, for example, a number of repetitions of the uplink data, a number of repetitions for a particular UCI, whether multiple beams are used to transmit instances of a repetition, a type of UCI, or any combinations thereof.

28 Claims, 18 Drawing Sheets

(56) References Cited

OTHER PUBLICATIONS

Samsung "Remaining Issues for PUSCH Enhancement" doc code R1-2003867, Publication Date Jun. 5, 2020 (Year: 2020).*
CATT: "Remaining Issues on PUSCH Enhancements", 3GPP TSG RAN WG1 #100bis, R1-2002084, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 10, 2020-Apr. 30, 2020, Apr. 11, 2020, XP051875441, 19 Pages.
International Search Report and Written Opinion—PCT/US2022/028195—ISA/EPO—Aug. 18, 2022 (2104694WO).
Samsung: "Remaining Issues for PUSCH Enhancement", 3GPP TSG RAN WG1 #101, R1-2003867, 3rd Generation Partnership Project (3GPP), Mobile Competence Centre, 650, Route Des Lucioles, F-06921 Sophia-Antipolis Cedex, France, vol. RAN WG1, No. e-Meeting, May 25, 2020-Jun. 5, 2020, May 15, 2020, XP051885636, 3 Pages.

* cited by examiner

UPLINK CONTROL INFORMATION MULTIPLEXING TECHNIQUES FOR UPLINK COMMUNICATIONS USING MULTIPLE REPETITIONS

CROSS REFERENCE

The present Application for Patent claims the benefit of U.S. Provisional Patent Application No. 63/185,888 by CHEN et al., entitled "UPLINK CONTROL INFORMATION MULTIPLEXING TECHNIQUES FOR UPLINK COMMUNICATIONS USING MULTIPLE REPETITIONS," filed May 7, 2021, assigned to the assignee hereof, and expressly incorporated by reference herein.

FIELD OF TECHNOLOGY

The following relates to wireless communications, including uplink control information multiplexing techniques for uplink communications using multiple repetitions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems, such as 4G and 5G systems, may support directional communications using one or multiple directional beams. Some wireless communications systems, such as 4G and 5G systems, may support repetition of physical channels, such as physical uplink control channels (PUCCH) or physical uplink shared channels (PUSCH), or both. As demand for communication efficiency and reliability increases, efficient techniques for repetition of uplink communications and multiplexing of uplink communications are desirable.

SUMMARY

The described techniques relate to improved methods, systems, devices, and apparatuses that support uplink control information multiplexing techniques for uplink communications using multiple repetitions. Various aspects of the described techniques provide for transmission of multiple repetitions of uplink control information (UCI) in which a spectral efficiency ratio of uplink data to the UCI is scaled based on one or more parameters associated with the multiple repetitions. In some cases, a user equipment (UE) may receive an uplink grant from a base station or network entity with a set of uplink resources for an uplink data transmission, where the uplink data transmission is to be transmitted in a set of repetitions and UCI is to be multiplexed with at least some of the repetitions. The uplink grant may provide a set of uplink resources, and the UE may determine a first subset of the uplink resources for the UCI (e.g., a number of resource elements (REs) for UCI) and a second subset of the uplink resources for the uplink data transmission. The first subset of uplink resources may be determined based on a spectral efficiency ratio that is provided by the base station or network entity as an offset value (e.g., a beta-offset that is provided to the UE), where the offset value is scaled based on the one or more parameters associated with the multiple repetitions. The one or more parameters may include, for example, a number of repetitions of the uplink data, a number of repetitions for a particular UCI, whether multiple beams are used to transmit instances of a repetition, a type of UCI, or any combinations thereof.

A method for wireless communication at a user equipment (UE) is described. The method may include receiving an uplink grant with a set of uplink resources for an uplink data transmission from the UE, where the uplink data transmission is to be transmitted in a set of repetitions, and at least a subset of the set of repetitions include uplink control information that is multiplexed with the uplink data transmission and transmitting the set of repetitions in the set of uplink resources, where a first subset of the set of uplink resources is for the uplink control information and a second subset of the set of uplink resources is for the uplink data transmission, and the first subset of uplink resources is determined for each of one or more repetitions in the subset of repetitions based on an offset value associated with uplink control information transmissions and a scaling factor applied to the offset value, where an amount of resources in the first subset of uplink resources is determined based on the offset value as scaled by the scaling factor, and where the scaling factor is based on one or more parameters associated with the set of repetitions, the uplink control information, or any combinations thereof.

An apparatus for wireless communication at a UE is described. The apparatus may include a processor, memory coupled with the processor, and instructions stored in the memory. The instructions may be executable by the processor to cause the apparatus to receive an uplink grant with a set of uplink resources for an uplink data transmission from the UE, where the uplink data transmission is to be transmitted in a set of repetitions, and at least a subset of the set of repetitions include uplink control information that is multiplexed with the uplink data transmission and transmit the set of repetitions in the set of uplink resources, where a first subset of the set of uplink resources is for the uplink control information and a second subset of the set of uplink resources is for the uplink data transmission, and the first subset of uplink resources is determined for each of one or more repetitions in the subset of repetitions based on an offset value associated with uplink control information transmissions and a scaling factor applied to the offset value, where an amount of resources in the first subset of uplink resources is determined based on the offset value as scaled by the scaling factor, and where the scaling factor is based on one or more parameters associated with the set of repetitions, the uplink control information, or any combinations thereof.

Another apparatus for wireless communication at a UE is described. The apparatus may include means for receiving an uplink grant with a set of uplink resources for an uplink data transmission from the UE, where the uplink data transmission is to be transmitted in a set of repetitions, and at least a subset of the set of repetitions include uplink control information that is multiplexed with the uplink data transmission and means for transmitting the set of repetitions in the set of uplink resources, where a first subset of the set of uplink resources is for the uplink control information and a second subset of the set of uplink resources is for the uplink data transmission, and the first subset of uplink resources is determined for each of one or more repetitions in the subset of repetitions based on an offset value associated with uplink control information transmissions and a scaling factor applied to the offset value, where an amount of resources in the first subset of uplink resources is determined based on the offset value as scaled by the scaling factor, and where the scaling factor is based on one or more parameters associated with the set of repetitions, the uplink control information, or any combinations thereof.

A non-transitory computer-readable medium storing code for wireless communication at a UE is described. The code may include instructions executable by a processor to receive an uplink grant with a set of uplink resources for an uplink data transmission from the UE, where the uplink data transmission is to be transmitted in a set of repetitions, and at least a subset of the set of repetitions include uplink control information that is multiplexed with the uplink data transmission and transmit the set of repetitions in the set of uplink resources, where a first subset of the set of uplink resources is for the uplink control information and a second subset of the set of uplink resources is for the uplink data transmission, and the first subset of uplink resources is determined for each of one or more repetitions in the subset of repetitions based on an offset value associated with uplink control information transmissions and a scaling factor applied to the offset value, where an amount of resources in the first subset of uplink resources is determined based on the offset value as scaled by the scaling factor, and where the scaling factor is based on one or more parameters associated with the set of repetitions, the uplink control information, or any combinations thereof.

Some examples of the method, apparatuses, and non-transitory computer-readable medium described herein may further include operations, features, means, or instructions for receiving the offset value in downlink control information or in configuration signaling, where the offset value provides a spectral efficiency ratio of the uplink data transmission to the uplink control information, and the scaling factor provides a scaled spectral efficiency ratio of the uplink data transmission to the uplink control information that may be based on the one or more parameters. In some examples of the method, apparatuses, and non-transitory computer-readable medium described herein, the scaling factor may be determined separately for each repetition in the subset of the set of repetitions.

In some examples of the method, apparatuses, and non-transitory computer-readable medium described herein, a first repetition of the subset of repetitions includes a first type of uplink control information and a second repetition of the subset of repetitions includes a second type of uplink control information, and where the scaling factor is determined separately for the first type of uplink control information and the second type of uplink control information. In some examples of the method, apparatuses, and non-transitory computer-readable medium described herein, the scaling factor may be based on a number of uplink data transmission repetitions in the set of repetitions, a quantity of uplink data transmission repetitions in the set of repetitions without uplink control information multiplexed therewith, or any combinations thereof. In some examples of the method, apparatuses, and non-transitory computer-readable medium described herein, the scaling factor may be based on a number of the subset of repetitions on which a particular uplink control information may be multiplexed.

In some examples of the method, apparatuses, and non-transitory computer-readable medium described herein, the offset value may be scaled by the scaling factor to provide a total number of resource elements across the subset of repetitions that is equal to a number of resource elements that would be used if the uplink control information were to be multiplexed with a single repetition of the uplink data transmission.

Some examples of the method, apparatuses, and non-transitory computer-readable medium described herein may further include operations, features, means, or instructions for receiving configuration information for two or more uplink reference signal resource sets, and where the scaling factor is based on whether the subset of repetitions is associated with a single uplink reference signal resource set or multiple uplink reference signal resource sets. In some examples of the method, apparatuses, and non-transitory computer-readable medium described herein, the scaling factor may be based on a type of information included in the uplink control information.

In some examples of the method, apparatuses, and non-transitory computer-readable medium described herein, the type of information included in the uplink control information includes one or more of periodic channel state information (CSI), aperiodic CSI, semi-persistent CSI, acknowledgment/negative-acknowledgment feedback information, or any combinations thereof. In some examples of the method, apparatuses, and non-transitory computer-readable medium described herein, the scaling factor may be based on a reliability target associated with the uplink control information.

A method for wireless communication at an access network entity is described. The method may include transmitting, to a UE, an uplink grant with a set of uplink resources for an uplink data transmission from the UE to the access network entity, where the uplink data transmission is to be transmitted in a set of repetitions, and at least a subset of the set of repetitions include uplink control information and receiving the set of repetitions in the set of uplink resources, where a first subset of the set of uplink resources includes the uplink control information and a second subset of the set of uplink resources includes the uplink data transmission, and the first subset of uplink resources is determined for each of one or more repetitions in the subset of repetitions based on an offset value associated with uplink control information transmissions and a scaling factor applied to the offset value, where an amount of resources in the first subset of uplink resources is determined based on the offset value as scaled by the scaling factor, and where the scaling factor is based on one or more parameters associated with the set of repetitions, the uplink control information, or any combinations thereof.

An apparatus for wireless communication at an access network entity is described. The apparatus may include a processor, memory coupled with the processor, and instructions stored in the memory. The instructions may be executable by the processor to cause the apparatus to transmit, to a UE, an uplink grant with a set of uplink resources for an uplink data transmission from the UE to the access network entity, where the uplink data transmission is to be transmitted in a set of repetitions, and at least a subset of the set of repetitions include uplink control information and receive the set of repetitions in the set of uplink resources, where a first subset of the set of uplink resources includes the uplink control information and a second subset of the set of uplink resources includes the uplink data transmission, and the first subset of uplink resources is determined for each of one or more repetitions in the subset of repetitions based on an offset value associated with uplink control information transmissions and a scaling factor applied to the offset value, where an amount of resources in the first subset of uplink resources is determined based on the offset value as scaled by the scaling factor, and where the scaling factor is based on one or more parameters associated with the set of repetitions, the uplink control information, or any combinations thereof.

Another apparatus for wireless communication at an access network entity is described. The apparatus may include means for transmitting, to a UE, an uplink grant with a set of uplink resources for an uplink data transmission from the UE to the access network entity, where the uplink data transmission is to be transmitted in a set of repetitions, and at least a subset of the set of repetitions include uplink control information and means for receiving the set of repetitions in the set of uplink resources, where a first subset of the set of uplink resources includes the uplink control information and a second subset of the set of uplink resources includes the uplink data transmission, and the first subset of uplink resources is determined for each of one or more repetitions in the subset of repetitions based on an offset value associated with uplink control information transmissions and a scaling factor applied to the offset value, where an amount of resources in the first subset of uplink resources is determined based on the offset value as scaled by the scaling factor, and where the scaling factor is based on one or more parameters associated with the set of repetitions, the uplink control information, or any combinations thereof.

A non-transitory computer-readable medium storing code for wireless communication at an access network entity is described. The code may include instructions executable by a processor to transmit, to a UE, an uplink grant with a set of uplink resources for an uplink data transmission from the UE to the access network entity, where the uplink data transmission is to be transmitted in a set of repetitions, and at least a subset of the set of repetitions include uplink control information and receive the set of repetitions in the set of uplink resources, where a first subset of the set of uplink resources includes the uplink control information and a second subset of the set of uplink resources includes the uplink data transmission, and the first subset of uplink resources is determined for each of one or more repetitions in the subset of repetitions based on an offset value associated with uplink control information transmissions and a scaling factor applied to the offset value, where an amount of resources in the first subset of uplink resources is determined based on the offset value as scaled by the scaling factor, and where the scaling factor is based on one or more parameters associated with the set of repetitions, the uplink control information, or any combinations thereof.

Some examples of the method, apparatuses, and non-transitory computer-readable medium described herein may further include operations, features, means, or instructions for signaling the offset value to the UE via downlink control information or in configuration signaling, where the offset value provides a spectral efficiency ratio of the uplink data transmission to the uplink control information, and the scaling factor provides a scaled spectral efficiency ratio of the uplink data transmission to the uplink control information that may be based on the one or more parameters. In some examples of the method, apparatuses, and non-transitory computer-readable medium described herein, the scaling factor may be determined separately for each repetition in the subset of the set of repetitions.

In some examples of the method, apparatuses, and non-transitory computer-readable medium described herein, a first repetition of the subset of repetitions includes a first type of uplink control information and a second repetition of the subset of repetitions includes a second type of uplink control information, and where the scaling factor is determined separately for the first type of uplink control information and the second type of uplink control information. In some examples of the method, apparatuses, and non-transitory computer-readable medium described herein, the scaling factor may be based on a number of uplink data transmission repetitions in the set of repetitions, a quantity of uplink data transmission repetitions in the set of repetitions without uplink control information multiplexed therewith, or any combinations thereof. In some examples of the method, apparatuses, and non-transitory computer-readable medium described herein, the scaling factor may be based on a number of the subset of repetitions on which a particular uplink control information may be multiplexed. In some examples of the method, apparatuses, and non-transitory computer-readable medium described herein, the offset value may be scaled by the scaling factor to provide a total number of resource elements across the subset of repetitions that is equal to a number of resource elements that would be used if the uplink control information were to be multiplexed with a single repetition of the uplink data transmission.

Some examples of the method, apparatuses, and non-transitory computer-readable medium described herein may further include operations, features, means, or instructions for configuring the UE with two or more uplink reference signal resource sets, and where the scaling factor is based on whether the subset of repetitions is associated with a single uplink reference signal resource set or multiple uplink reference signal resource sets.

In some examples of the method, apparatuses, and non-transitory computer-readable medium described herein, the scaling factor may be based on a type of information included in the uplink control information. In some examples of the method, apparatuses, and non-transitory computer-readable medium described herein, the type of information included in the uplink control information includes one or more of periodic CSI, aperiodic CSI, semi-persistent CSI, acknowledgment/negative-acknowledgment feedback information, or any combinations thereof. In some examples of the method, apparatuses, and non-transitory computer-readable medium described herein, the scaling factor may be based on a reliability target associated with the uplink control information.

DETAILED DESCRIPTION

Figure 1:
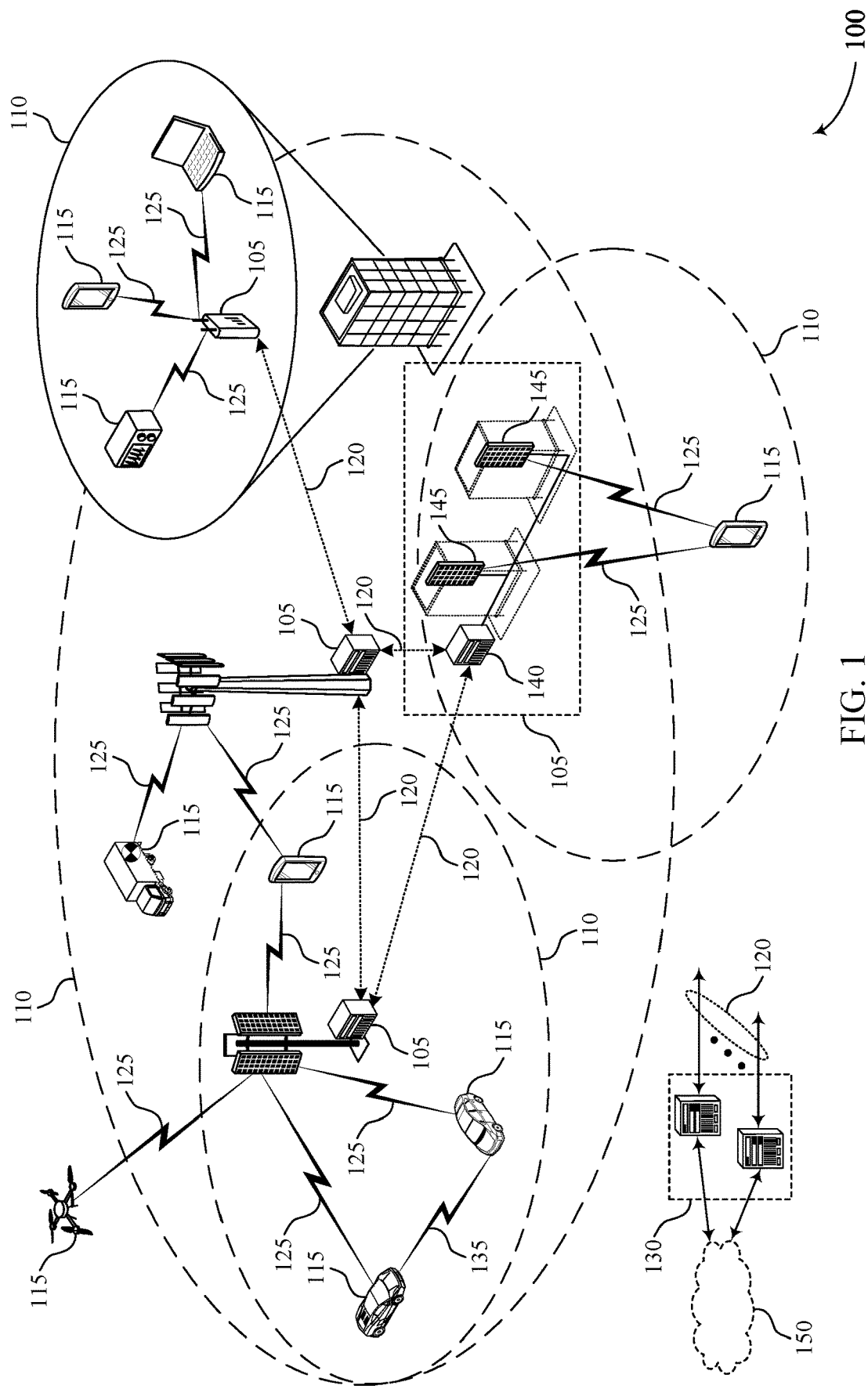
FIG. 1 illustrates an example of a wireless communications system that supports uplink control information multiplexing techniques for uplink communications using multiple repetitions in accordance with aspects of the present disclosure.

A wireless communications system may support communications in a variety of different channel conditions, and may select various transmission parameters based on particular channel conditions that are present between a user equipment (UE) and a base station or access network entity. In some cases, in the event that a UE has relatively poor channel conditions, one or more communication parameters may be set to help maintain reliable communications in such conditions. In some cases, to help provide for reliable communications over a relatively poor channel, a base station or access network entity may configure multiple repetitions for certain communications, in order to enhance the likelihood of successful reception of the communication. In some cases, for communications with multiple repetitions, a receiving device may buffer received signals of a first instance of a communication in a soft buffer and may add subsequent received signals of a second instance of the communication to the soft buffer. The aggregate buffered signals may then be used to attempt to decode the communication, which may provide a higher likelihood of successful decoding relative to trying to decode each repetition individually. Such techniques may be referred to as soft combining or soft buffering.

In order for soft combining to provide aggregate buffered signals across multiple repetitions of a communication, each repetition should have a similar or same number of encoded bits that occupy resources of a soft buffer, such that multiple repetitions can simply be added into corresponding soft buffer resources. When uplink control information (UCI) is multiplexed with uplink data channel (e.g., physical uplink shared channel (PUSCH)) transmissions, the transmitting UE may determine resources for the UCI based at least in part on an offset value (e.g., a beta-offset value) that indicates a spectral efficiency ratio of uplink data to the UCI. However, in some cases where UCI is multiplexed on multiple uplink data channel (e.g., PUSCH) repetitions, UCI payloads on different PUSCH repetitions may be different, which may result in different amounts of UCI versus data channel resources for different repetitions and which may degrade performance of soft buffering of the repetitions.

For example, multiple repetitions may be enabled when a UE is configured for multiple transmission-reception point (TRP) communications, where different PUSCH transmission occasions for a same transport block are transmitted to different TRPs. However, different TRPs may have different channel conditions and different beams, so may be configured with different sounding reference signal (SRS) resource sets and may have different channel state information (CSI) measurement reports. In order to accommodate the different SRS resources and different CSI reports, certain repetitions of a PUSCH may have UCI that corresponds to a defined beam (e.g., first/second repetitions may include first/second CSI reports, respectively). However, this may result in different repetitions of UCI having different payloads. When determining uplink REs that are to include UCI, the UE uses the offset value that adjusts a number of REs for UCI based on a spectral efficiency ratio between the UCI and uplink data transmission, and using the same offset for multiple UCI repetitions having different payloads may thus result in different spectral efficiencies, which may be undesirable.

In accordance with various techniques as discussed herein, transmission of multiple repetitions of UCI may be provided in which a spectral efficiency ratio of uplink data to the UCI is scaled based at least in part on one or more parameters associated with the multiple repetitions. In some cases, a UE may receive an uplink grant from a base station or access network entity with a set of uplink resources for an uplink data transmission, where the uplink data transmission is to be transmitted in a set of repetitions and UCI is to be multiplexed with at least some of the repetitions. The uplink grant may provide a set of uplink resources, and the UE may determine a first subset of the uplink resources for the UCI (e.g., a number of resource elements (REs) for UCI) and a second subset of the uplink resources for the uplink data transmission. The UCI may then be encoded, rate-matched, and modulated to generate modulated UCI symbols. The modulated UCI symbols may be mapped to some of the uplink resources and transmitted with the uplink data transmission in other of the uplink resources. The first subset of uplink resources may be determined based at least in part on a spectral efficiency ratio that is provided by the base station as an offset value (e.g., a beta-offset that is provided to the UE), and in aspects provided herein the offset value is scaled based on the one or more parameters associated with the multiple repetitions. The one or more parameters may include, for example, a number of repetitions of the uplink data, a number of repetitions for a particular UCI, whether multiple beams are used to transmit instances of a repetition (e.g., in multiple transmission-reception point (TRP) operations that may use multiple sounding reference signal (SRS) resource sets), a type of UCI, or any combinations thereof.

The techniques employed in accordance with various aspects described herein may provide benefits and enhancements to the operation of a system. For example, described techniques may provide improvements to reliability and efficiency in communications by allowing reliable and efficient combining of multiple uplink repetitions, which may increase the likelihood of successfully decoding uplink data and UCI that are transmitted in the repetitions. Such improvements may enhance efficiency of wireless communications at a UE by reducing latency and reducing a number of retransmissions. In some examples, described techniques may provide for UE determination of the scaling factor for the offset value based on predetermined or configured parameters, which may provide for efficient signaling of the offset value according to established signaling (e.g., in downlink control information (DCI) for dynamic beta-offset indications or radio resource control (RRC) signaling for semi-static beta-offset indications), and the UE may scale the indicated offset based on the particular repetition configuration, type of UCI, or any combinations thereof.

Aspects of the disclosure are initially described in the context of wireless communications systems. Various examples of multiplexing of UCI repetitions of a transmission are then discussed. Aspects of the disclosure are further illustrated by and described with reference to a process flow, apparatus diagrams, system diagrams, and flowcharts that relate to uplink control information multiplexing techniques for uplink communications using multiple repetitions.

FIG. 1 illustrates an example of a wireless communications system 100 that supports uplink control information multiplexing techniques for uplink communications using multiple repetitions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may be configured for transmission of multiple repetitions of UCI and uplink data, in which a spectral efficiency ratio of uplink data to the UCI is scaled based on one or more parameters associated with the multiple repetitions. In some cases, the UE 115 may receive an uplink grant from a base station 105 with a set of uplink resources for an uplink data transmission, where the uplink data transmission is to be transmitted in a set of repetitions and UCI is to be multiplexed with at least some of the repetitions. The uplink grant may provide a set of uplink resources, and the UE 115 may determine a first subset of the uplink resources for the UCI (e.g., a number of REs for UCI) and a second subset of the uplink resources for the uplink data transmission. The first subset of uplink resources may be determined based on a spectral efficiency ratio that is provided by the base station 105 as an offset value (e.g., a beta-offset that is provided to the UE 115), where the offset value is scaled based on the one or more parameters associated with the multiple repetitions. The one or more parameters may include, for example, a number of repetitions of the uplink data, a number of repetitions for a particular UCI, whether multiple beams are used to transmit instances of a repetition, a type of UCI, or any combinations thereof.

Figure 2:
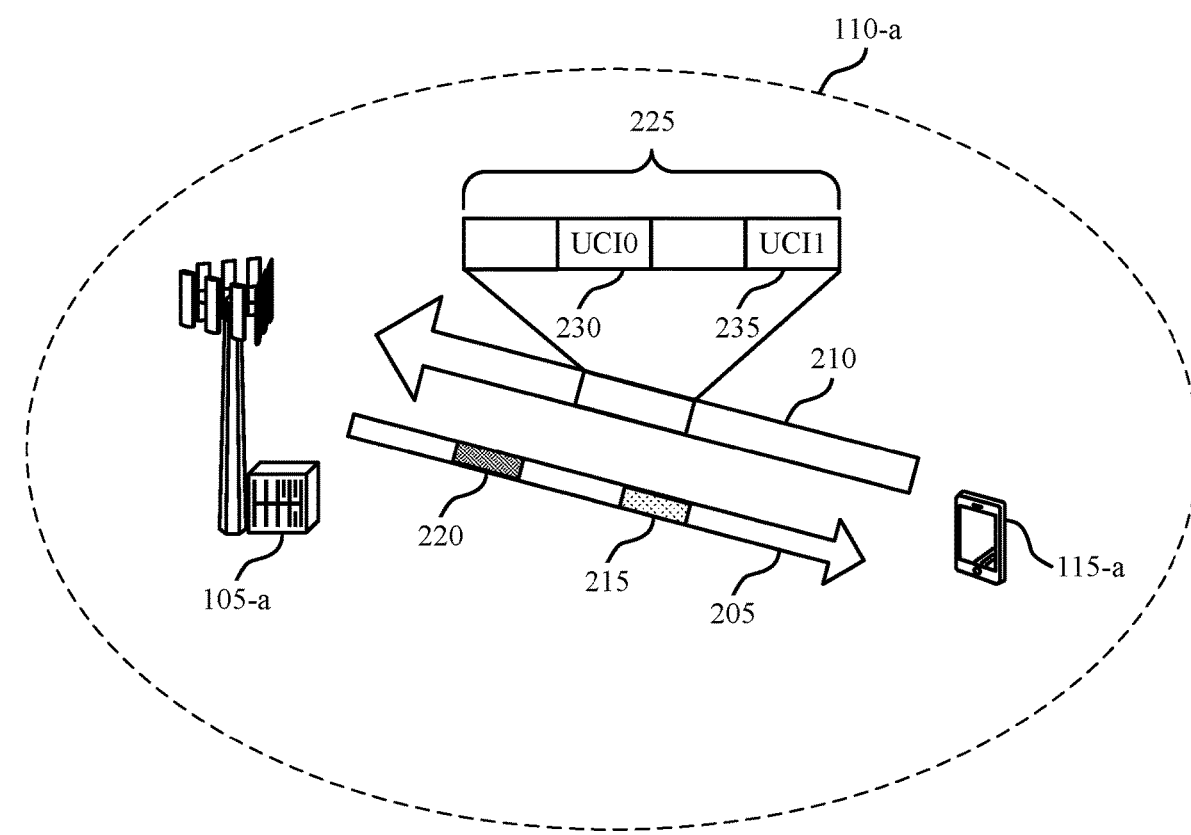
FIG. 2 illustrates an example of a portion of a wireless communications system that supports uplink control information multiplexing techniques for uplink communications using multiple repetitions in accordance with aspects of the present disclosure.

FIG. 2 illustrates an example of a wireless communications system 200 that supports uplink control information multiplexing techniques for uplink communications using multiple repetitions in accordance with aspects of the present disclosure. In some examples, wireless communications system 200 may implement aspects of wireless communications system 100. The wireless communications system 200 may include base station 105-*a* and UE 115-*a* which may be examples of a base station or UE described above with reference to FIG. 1. Base station 105-*a* and UE 115-*a* may communicate with one another within coverage area 110-*a* using downlink 205 and uplink 210 communications and using techniques described above with reference to FIG. 1. The wireless communications system 200 may provide for repetitions of certain communications in order to enhance the likelihood of successful receipt and decoding of the communications, and thereby enhance system reliability and efficiency.

In the example of FIG. 2, the base station 105-*a* may transmit and the UE 115-*a* may receive configuration information that provides a repetition configuration 215. The repetition configuration 215 may indicate, for example, an offset value for a ratio of spectral efficiency between UCI and uplink data for uplink transmissions with UCI that is multiplexed with uplink data, and scaling information for scaling the offset value based on one or more parameters of the uplink repetitions, in accordance with techniques discussed herein, among other configuration information. The base station 105-*a* may also provide an uplink grant 220 that allocates uplink resources to the UE 115-*a*, including uplink resources for multiple repetitions of one or more uplink communications.

UCI may include various types of control information that the UE 115-*a* is to transmit to the base station 105-*a*, such as HARQ feedback based on a result of the decoding other downlink communications from the base station 105-*a*, CSI information (e.g., CSI part 1 and CSI part 2 information) associated with one or multiple TRPs, one or more status reports or scheduling requests, uplink reference signals, or any combinations thereof. Repetition techniques for one or multiple TRPs as discussed herein may provide for enhanced likelihood of successful reception and decoding of transmissions, and thereby reduce the likelihood that an uplink communication will need to be retransmitted. In this example, the UE 115-*a* may be allocated with uplink resources 225 which may include resources for multiple repetitions of an uplink data transmission, where one or multiple of the repetitions have UCI that is multiplexed with the uplink data. In this example a first UCI repetition 230 (UCI0) and a second UCI repetition 235 (UCI1) are multiplexed with repetitions of uplink data.

The uplink repetitions may be transmitted in accordance with repetition techniques, where different PUSCH transmission occasions (e.g., repetitions) corresponding to the same transport block (TB) are transmitted in different slots (e.g., in repetition Type A as defined in 3GPP specifications) or mini-slots (e.g., in repetition Type B as defined in 3GPP specifications). The number of repetitions can be configured in the repetition configuration 215 (e.g., RRC configured) or can be indicated dynamically through in downlink control information that provides the uplink grant 220 (e.g., in a TDRA field of the DCI as defined in 3GPP specifications). In some case, all the repetitions are transmitted with the same beam (e.g., the SRS resource indicator (SRI) field of the DCI is applied to all the repetitions). The SRI is a field in the DCI that determines the beam/power control for PUSCH by pointing to one or more SRS resources within a SRS resource set. When different PUSCH repetitions are intended to be received at different TRPs/panels/antennas at the base station 105-*a*, the same beam for all the repetitions may not be optimal, and in such cases uplink repetitions can be associated with different SRI fields and thus belong to two sets where each set has its own beam and power control. To achieve this, different repetitions may correspond to two different SRS resource sets (e.g., the DCI indicates two beams and two sets of power control parameters by indicating one or more SRS resources within each of the two SRS resource sets).

In some cases, the UE 115-*a* may determine the number of REs in uplink repetitions (e.g., PUSCH repetitions) for UCI transmission using the indicated offset value (e.g., a configured (in RRC) or indicated (by DCI) beta_offset) that is scaled by a scaling factor, where the scaling factor is determined separately for each repetition or for each UCI, based at least in part on one or more parameters associated with the UCI and/or repetitions. In some cases, one of the parameters may include a number of repetitions (e.g., number of PUSCH repetitions), or the number of repetitions without any UCI multiplexed thereon. In such cases, larger numbers of repetitions provide more resources for the uplink shared channel (UL-SCH) overall, which means that if UCI is multiplexed in a subset of repetitions (e.g. in one of them), more REs may be allocated to the UCI with relatively little impact on the reliability of the uplink data transmission. In such cases, the UE 115-*a* may scale-up the offset value offset by the number of PUSCH repetitions or by the number of PUSCH repetitions that do not have UCI multiplexed thereon.

In some cases, one of the parameters may include a number of PUSCH repetitions on which a particular UCI is multiplexed (e.g., based on if the UCI includes CSI, HARQ feedback, SR, and the like). For example, aperiodic CSI (A-CSI), the CSI report may be multiplexed on two repetitions, and thus the offset value can be scaled down by a factor of two to keep the total number of REs for the A-CSI the same as in cases where A-CSI is multiplexed on one PUSCH repetition. In some cases, the one or more parameters may include whether the PUSCH repetitions are associated with one SRS resource set (e.g., one set of transmissions parameters for all repetitions such as one beam, one set of power control parameters, one precoding) or with two SRS resource sets (e.g., two sets of transmission parameters for two sets of repetitions, which may be for two TRPs or antenna panels). In such cases, it may not be effective to scale-up or scale-down the offset value, since the motivation for two sets of transmission parameters is for reliability in a blockage scenario (e.g., one TRP can be randomly blocked). In some cases, when two SRS resource sets are configured, the offset value for one of the resource sets may be scaled up or scaled down based on a number of repetitions per beam (e.g., number of repetitions for one SRI is different than for a different SRI).

In some cases, the one or more parameters may include a type of UCI. For example when UCI is CSI, scaling can be a function of whether CSI is A-CSI, semi-persistent CSI (SP-CSI), or periodic CSI (P-CSI). For example, in some cases only A-CSI can be multiplexed with the UCI on two PUSCH repetitions, and for other UCI types UCI is multiplexed only on one PUSCH repetition. Furthermore, the required reliability-level of A-CSI may be different than P-CSI. Thus, the offset value may be scaled differently at the UE for A-CSI versus P-CSI or SP-CSI. For example, the offset value for A-CSI may be scaled down from the indicated offset value, and the offset value for P-CSI or SP-CSI may not be scaled from the indicated offset value. Other types of UCI may include HARQ ACK/NACK feedback, scheduling requests (SRs), buffer status reports (BSRs), and others, which may in some cases have different scaling factors. In some cases, different combinations of the one or more parameters may be used to determine a scaling factor for the signaled offset value.

Figure 3:
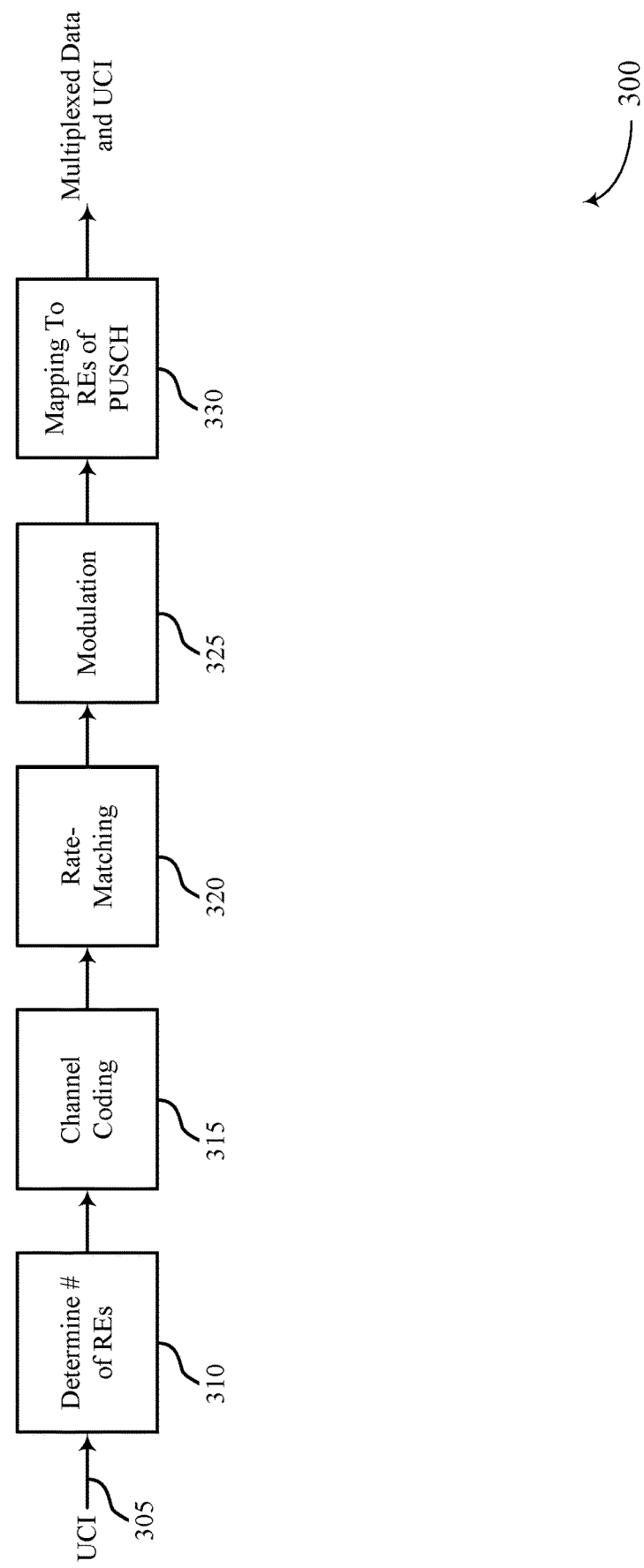
FIG. 3 illustrates an example of a encoding and multiplexing scheme that supports uplink control information multiplexing techniques for uplink communications using multiple repetitions in accordance with aspects of the present disclosure.

FIG. 3 illustrates an example of an encoding and multiplexing scheme 300 that supports uplink control information multiplexing techniques for uplink communications using multiple repetitions in accordance with aspects of the present disclosure. In some examples, encoding and multiplexing scheme 300 may implement aspects of wireless communications system 100 or 200.

As discussed, in some cases one or more repetitions of UCI may be multiplexed with uplink data in a PUSCH communication from a UE (e.g., a UE 115 of FIG. 1 or 2) to a base station (e.g., a base station 105 of FIG. 1 or 2). The determination of the PUSCH resources over which UCI is to be multiplexed may be based on various configuration parameters and the UCI itself, as discussed herein. In this example, UCI 305 may be identified at a UE, and at 310, the UE may determine a number of resource elements in the PUSCH for UCI transmission. This determines a number of bits for output of rate-matching and also determines a mother code length for encoding (e.g., for polar coding). The UE may then perform channel coding at 315, followed by rate-matching at 320 and modulation at 325. Then, at 330, the modulated symbols of UCI are mapped to some of the REs of PUSCH. RE mapping may be based on a set of rules, and may depend on UCI type(s), PUSCH demodulation reference signal (DMRS) symbol location, and the like. These steps are performed for each UCI that overlaps with the PUSCH (e.g., first for HARQ-ACK/NACK information (if present), then for CSI part 1 (if present), then for CSI part 2 (if present)). The transmitted UCI in such cases uses a same modulation order and a same number of layers as the PUSCH communication (which are indicated in a DCI that schedules the PUSCH).

When determining the number of resource elements at 310, the UE may determine a quantity Q', which is the number of coded modulation symbols per layer (i.e. number of REs for UCI), and is determined first for HARQ-ACK/NAK, then CSI part 1, then CSI part 2. For HARQ ACK/NACK information the quantity Q' may be determined, in cases where uplink data is also transmitted using PUSCH, based on the following formula:

$$Q'_{ACK} = \min\left\{\left\lceil \frac{(O_{ACK} + L_{ACK}) \cdot \beta^{PUSCH}_{offset} \cdot \sum_{l=0}^{N^{PUSCH}_{symb,all}-1} M^{UCI}_{sc}(l)}{\sum_{r=0}^{C_{UL-SCH}-1} K_r} \right\rceil, \left\lceil \alpha \cdot \sum_{l=l_0}^{N^{PUSCH}_{symb,all}-1} M^{UCI}_{sc}(l) \right\rceil\right\}$$

where the quantity ($O_{ACK}+L_{ACK}$) corresponds to the HARQ ACK/NACK payload size. The quantity for $\beta^{PUSCH}_{offset}$ is a value that is configured at the UE (e.g., via RRC signaling or dynamically indicated in the DCI scheduling the PUSCH) that controls the spectral efficiency ratio of PUSCH to UCI. The quantity for $\sum_{l=0}^{N^{PUSCH}_{symb,all}-1} M_{sc}^{UCI}(l)$ corresponds to the total number of PUSCH REs. The quantity for $\sum_{r=0}^{C_{UL-SCH}-1} K_r$ corresponds to the number of coded bits for uplink data (i.e., uplink shared channel (UL-SCH) bits). The quantity for $\alpha$ corresponds to a scaling factor to limit the number of REs assigned to UCI on PUSCH, and the quantity for $\sum_{l=l_0}^{N^{PUSCH}_{symb,all}-1} M_{sc}^{UCI}(l)$ corresponds to a maximum number of REs that can be used for UCI.

In cases where the UCI is to be transmitted using PUSCH and uplink data is not transmitted using PUSCH, the quantity Q' For HARQ ACK/NACK information may be determined based on the following formula:

$$Q'_{ACK} = \min\left\{\left\lceil \frac{(O_{ACK} + L_{ACK}) \cdot \beta^{PUSCH}_{offset}}{R \cdot Q_m} \right\rceil, \left\lceil \alpha \cdot \sum_{l=l_0}^{N^{PUSCH}_{symb,all}-1} M^{UCI}_{sc}(l) \right\rceil\right\}$$

in which the quantities used in the formula correspond to the same quantities discussed above for cases where uplink data is transmitted in the PUSCH. In this case, the quantity for the total number of PUSCH REs is not present, and the quantity for the number of coded bits for uplink data (UL-SCH) is replaced with $R \cdot Q_m$, where R corresponds to the code rate of the PUSCH and $Q_m$ correspond to the modulation order of the PUSCH.

In cases where the UCI includes CSI part 1 information to be transmitted using PUSCH, and in cases where UCI includes both CSI part 1 and CSI part 2 information, values for Q' may be determined in a similar manner, with the a maximum number of REs that can be used for UCI (as scaled by the quantity $\alpha$) adjusted to account for the number of coded modulation symbols for the HARQ ACK/NACK information (i.e., $Q'_{ACK}$) and, for CSI part 2 information, adjusted to account for both HARQ ACK/NACK and CSI part 1 information. In each case, the quantity for $\beta^{PUSCH}_{offset}$ (which is referred to interchangeably as beta-offset, and is an example of an offset value as discussed herein) is a value that is configured at the UE (e.g., via RRC signaling or dynamically indicated in the DCI scheduling the PUSCH) that controls the spectral efficiency ratio of PUSCH to UCI. In some cases, the value for beta-offset may be provided to the UE in one list (e.g., in the case of semi-static indication by RRC) or up to four lists (e.g., in the case of dynamic indication in DCI). Within each list, the beta-offset values may be RRC configured. In the case of dynamic indication of the offset value, a DCI may indicate which list is to be used (e.g., 2 bits in the DCI that schedules the PUSCH). In some cases, each list may include seven beta-offset values, namely three for HARQ-Ack (e.g., UCI bits≤2; 2<UCI bits≤11; 11<UCI bits), and two for each of CSI part 1 and CSI part 2 (e.g., 2<UCI bits≤11, 11<UCI bits). The value of the beta-offset may then be determined based on an index between 0 and 31 that is mapped to an actual offset value in one or more tables (which may be separate for HARQ-Ack and CSI). In such cases, the value of beta-offset may be determined at the UE, and then the scaling factor as discussed herein may be applied to the determined beta-offset value when determining the number of REs for the UCI.

Figure 4:
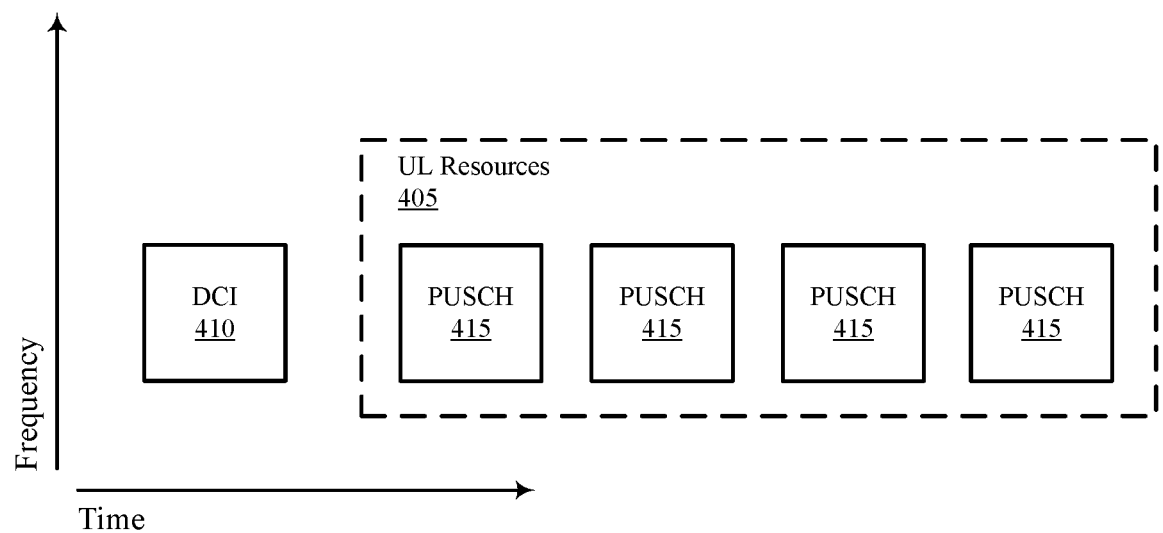
FIGS. 4 and 5 illustrate examples of uplink resources with UCI and PUSCH multiplexing that support uplink control information multiplexing techniques for uplink communications using multiple repetitions in accordance with aspects of the present disclosure.

FIG. 4 illustrates an example of a uplink resources with UCI and PUSCH multiplexing 400 that supports uplink control information multiplexing techniques for uplink communications using multiple repetitions in accordance with aspects of the present disclosure. In some examples, uplink resources with UCI and PUSCH 400 may implement aspects of wireless communications system 100 or 200. In this example, a number of uplink resources 405 may be allocated for uplink communications from a UE (e.g., a UE 115 of FIG. 1 or 2) to a base station (e.g., a base station 105 of FIG. 1 or 2). The uplink resources 405 may be indicated in an uplink grant, such as provided in DCI 410.

In the example illustrated in FIG. 4, the uplink resources 405 may be applicable to implementations or instances when the UE is configured to support UCI multiplexing operations on multiple uplink repetitions, for example, such as providing CSI reports. For example, the UCI multiplexing may be applicable to implementations or instances when the UE 115 is configured to provide CSI reports on PUSCH repetitions, to provide CSI reports using multiple antenna panels, and/or to provide CSI reports over multiple directional beams using one or more antenna panels. In some cases, one or more different types of UCI, in addition to CSI or alternatively thereto, may be multiplexed with PUSCH repetitions.

In some cases, the UE may receive, a DCI message 410 scheduling one or more PUSCH of a set of PUSCH repetitions 415, where UCI multiplexing may be used for UCI that is to be transmitted to the base station (e.g., scheduling the UE to transmit or multiplex the UCI on the one or more PUSCH repetitions 415). Based at least in part on the DCI message 410, the UE 115 may multiplex the UCI on the one or more PUSCH repetitions of the set of PUSCH repetitions 415. As discussed herein, a scaling factor may be applied to an offset value that is used for determining a number of REs for the UCI. For example, for PUSCH repetitions 415 with A-CSI multiplexed thereon, the UE may use a scaled beta offset $\beta'$ according to the following formula:

$$\beta' = (\text{total \# of repetitions}) \cdot \beta.$$

In such cases, the offset value is scaled up based on the number of repetitions. In other examples, some PUSCH repetitions may not include UCI, and in such cases the offset value may be scaled up by the number of repetitions that do include UCI.

In another example, the offset value may be scaled based on the number of PUSCH repetitions and the particular type of UCI. For example, for PUSCH repetitions with A-CSI multiplexed on, the UE may use a scaled beta offset $\beta'$ according to the following formula:

$$\beta' = \frac{\text{total \# of repetitions}}{\text{\# of repetitions with } A\text{-}CSI \text{ multiplexed thereon}} \cdot \beta.$$

In such cases, the offset value can be scaled up based on the number of repetitions, and scaled down based on the number of repetitions with a certain type of UCI. In the event that a different type of UCI is multiplexed on a repetition that does not include A-CSI, the UE could use the beta offset $\beta'' = \beta$.

In further examples, the offset value may be scaled based on the beam or antenna panel used for the repetitions. An example, of such scaling is discussed with reference to FIG. 5.

Figure 5:
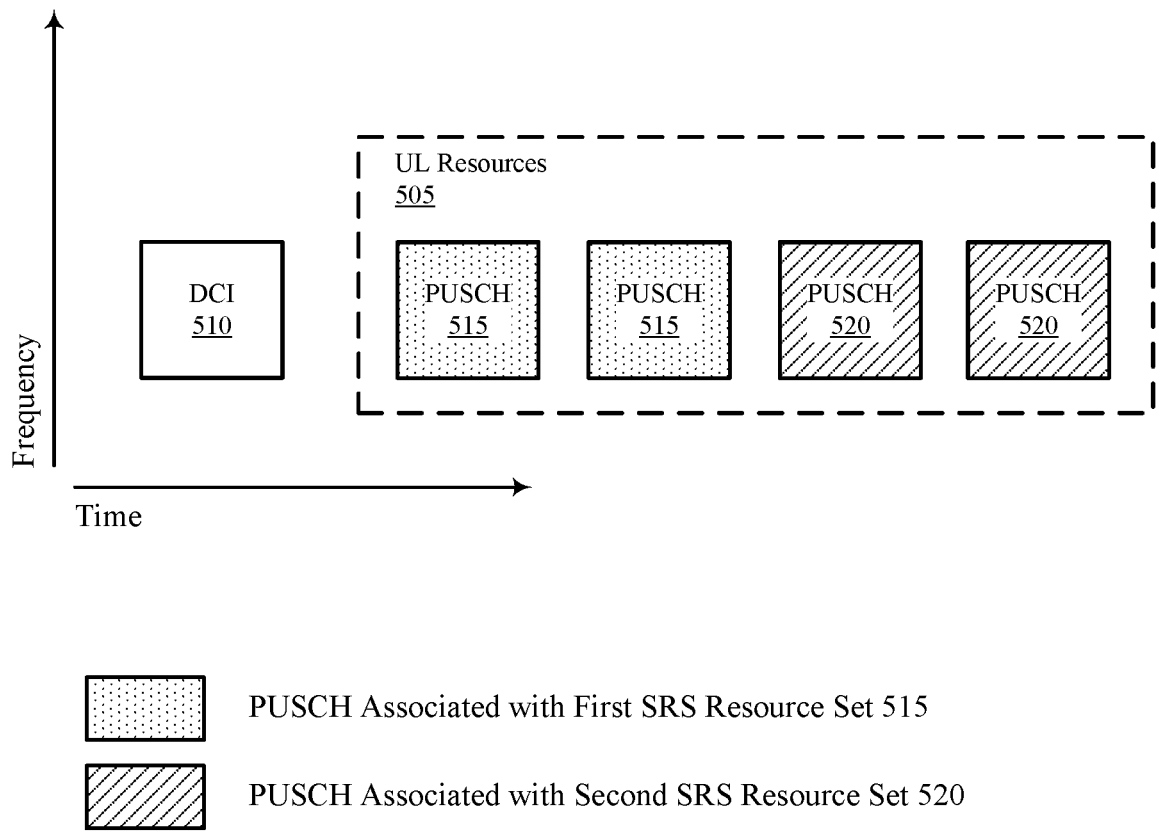

FIG. 5 illustrates an example of a uplink resources with UCI and PUSCH multiplexing 500 that supports uplink control information multiplexing techniques for uplink communications using multiple repetitions in accordance with aspects of the present disclosure. In some examples, uplink resources with UCI and PUSCH 500 may implement aspects of wireless communications system 100 or 200. In this example, a number of uplink resources 505 may be allocated for uplink communications from a UE (e.g., a UE 115 of FIG. 1 or 2) to a base station (e.g., a base station 105 of FIG. 1 or 2). The uplink resources 505 may be indicated in an uplink grant, such as provided in DCI 510.

In the example illustrated in FIG. 5, the uplink resources 505 may be applicable to implementations or instances when the UE is configured to support UCI multiplexing operations on multiple uplink repetitions, as discussed herein. In some cases, the UE may receive, a DCI message 510 scheduling one or more PUSCH of a set of PUSCH repetitions 515 and 520, where UCI multiplexing may be used for UCI that is to be transmitted to the base station (e.g., scheduling the UE to transmit or multiplex the UCI on the one or more PUSCH repetitions 515, 520). Based at least in part on the DCI message 510, the UE 115 may multiplex the UCI on the one or more PUSCH repetitions of the set of PUSCH repetitions 515, 520.

The UE 115 may determine a first subset of PUSCH repetitions 515 and a second subset of PUSCH repetitions 520. In some examples, the first subset of PUSCH repetitions 515 may correspond to a first beam or first set of power control parameters (e.g., based on a first SRI), while the second subset of PUSCH repetitions 520 may correspond to a second beam or second set of power control parameters (e.g., based on a second SRI). Thus, the first subset of PUSCH repetitions 515 may correspond to a first directional beam (e.g., a first mmW beam), while the second subset of PUSCH repetitions 520 may correspond to a second directional beam (e.g., a second mmW beam) different from the first directional beam. The UE 115 may, in some examples, multiplex the UCI on the one or more PUSCH repetitions of the set of PUSCH repetitions 515, 520. The first directional beam may be associated with a corresponding SRI, a TCI, a TPMI, or an SRS set identifier, or any combination thereof. Similarly, the second directional beam may be associated with a corresponding different SRI, TCI, TPMI, or SRS set identifier, or any combination thereof. Additionally, the first directional beam may belong to a first antenna panel, while the second directional beam may belong to a second antenna panel different from the first antenna panel.

The number of REs for the multiplexed UCI may be determined by the UE in accordance with techniques as discussed herein. For example, an offset value may be provided to the UE and used to determine the number of REs for the UCI, which may be scaled based on one or more parameters associated with the uplink transmission repetitions. In some cases, the offset value may be scaled based on a SRI associated with the repetitions, such that repetitions of the first subset of PUSCH repetitions 515 and repetitions of the second subset of PUSCH repetitions 520 have scaled offset values that are based on the beam used for one or more repetitions. For example, if a first instance of UCI is transmitted in one repetition of the first subset of PUSCH repetitions 515, and a second instance of the UCI is transmitted in one repetition of the second subset of PUSCH repetitions 520, in which cases the offset value may remain unscaled to provide a same number of UCI REs as for a single repetition for each beam/SRI. In some cases, the offset value may be scaled based on a number of repetitions, which beam is used, and a type of UCI. For example, for PUSCH repetitions without A-CSI multiplexed on, but with other type of UCIs multiplexed on, use scaled beta offset $\beta''$ may be determined according to the following formula:

$$\beta'' = \frac{\text{\# of repetitions per beam}}{\text{\# of repetitions per beam with non-}A\text{-}CSI \text{ UCIs multiplexed thereon}} \cdot \beta.$$

In such cases, the offset value can be scaled up based on the number of repetitions per beam, and scaled down based on the number of repetitions with a certain type of UCI.

Figure 6:
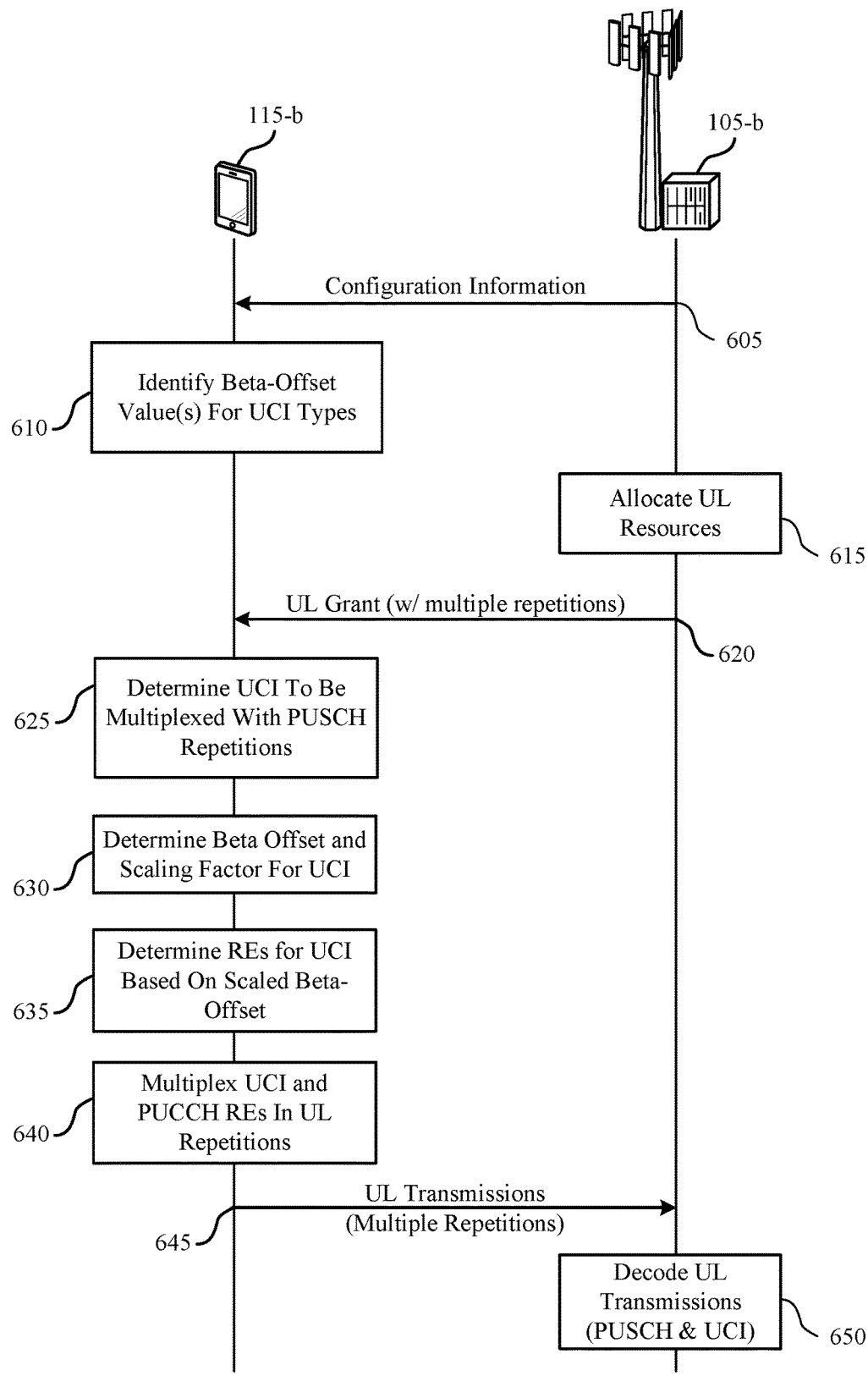
FIG. 6 illustrates an example of a process flow that supports uplink control information multiplexing techniques for uplink communications using multiple repetitions in accordance with aspects of the present disclosure.

FIG. 6 illustrates an example of a process flow 600 that supports uplink control information multiplexing techniques for uplink communications using multiple repetitions in accordance with aspects of the present disclosure. In some examples, process flow 600 may implement aspects of wireless communications system 100 or 200. Process flow 600 may be implemented by a UE 115-*b* and a base station 105-*b* as described herein. In the following description of the process flow 600, the communications between the UE 115-*b* and the base station 105-*b* may be transmitted in a different order than the example order shown, or the operations performed by the UE 115-*b* and base station 105-*b* may be performed in different orders or at different times. Some operations may also be omitted from the process flow 600, and other operations may be added to the process flow 600.

In some examples, the operations illustrated in process flow 600 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 605, the base station 105-*b* may transmit configuration information to the UE 115-*b*. In some cases, the base station 105 may transmit RRC signaling including an indication of beta-offset values for UCI multiplexing. In some cases, the configuration information may include an indication to perform offset value scaling based on one or more parameters for uplink repetitions. At 610, the UE 115-*b* may determine beta-offset values associated with one or more UCI types, based at least in part on the configuration information.

At 615, the base station 105-*b* may allocate uplink resources to the UE 115-*b*. In some cases, the uplink resources may be allocated to provide multiple repetitions of an uplink data transmission (e.g., multiple PUSCH repetitions). Further, different subsets of the uplink resources may have different SRIs, and thus be associated with different beams/panels, in some cases. At 620, the base station 105-*b* may transmit an uplink grant to the UE 115-*b* that indicates the allocated uplink resources and associated repetition information. In some cases, an indication of the offset value may be dynamically indicated with the uplink grant, as discussed herein.

At 625, the UE 115-*b* may determine that UCI is to be multiplexed with one or more PUSCH repetitions. In some cases, the determination of UCI multiplexing may be based on one or more parameters associated with the UCI, a configuration of the UE 115-*b* for UCI multiplexing, or any combinations thereof. At 630, the UE 115-*b* may determine the beta-offset and scaling factor for the UCI. The UE 115-*b* may make such determinations using one or more techniques as discussed herein. At 635, the UE 115-*b* may determine the REs for UCI based on the scaled beta-offset value. In some cases, the number of REs for the UCI is determined for each of one or more types of UCI (e.g., HARQ feedback, CSI part 1, CSI part 2) separately based on the scaled beta-offset value(s).

At 640, the UE 115-*b* may multiplex the UCI and PUCCH REs in the uplink repetitions. For example, the UE 115-*b* may perform channel coding, rate-matching, and modulation of the UCI REs, and then the modulated symbols of UCI may be mapped to some of the REs of PUSCH to generate multiplexed data and UCI. At 645, the UE 115-*b* may transmit the repetitions of the uplink transmissions, including multiplexed UCI and PUSCH. At 650, the base station 105-*b* may receive the uplink transmissions and decode the PUSCH and UCI. For example, the base station 105-*b* may use soft combining techniques to decode the PUSCH and UCI.

Figure 7:
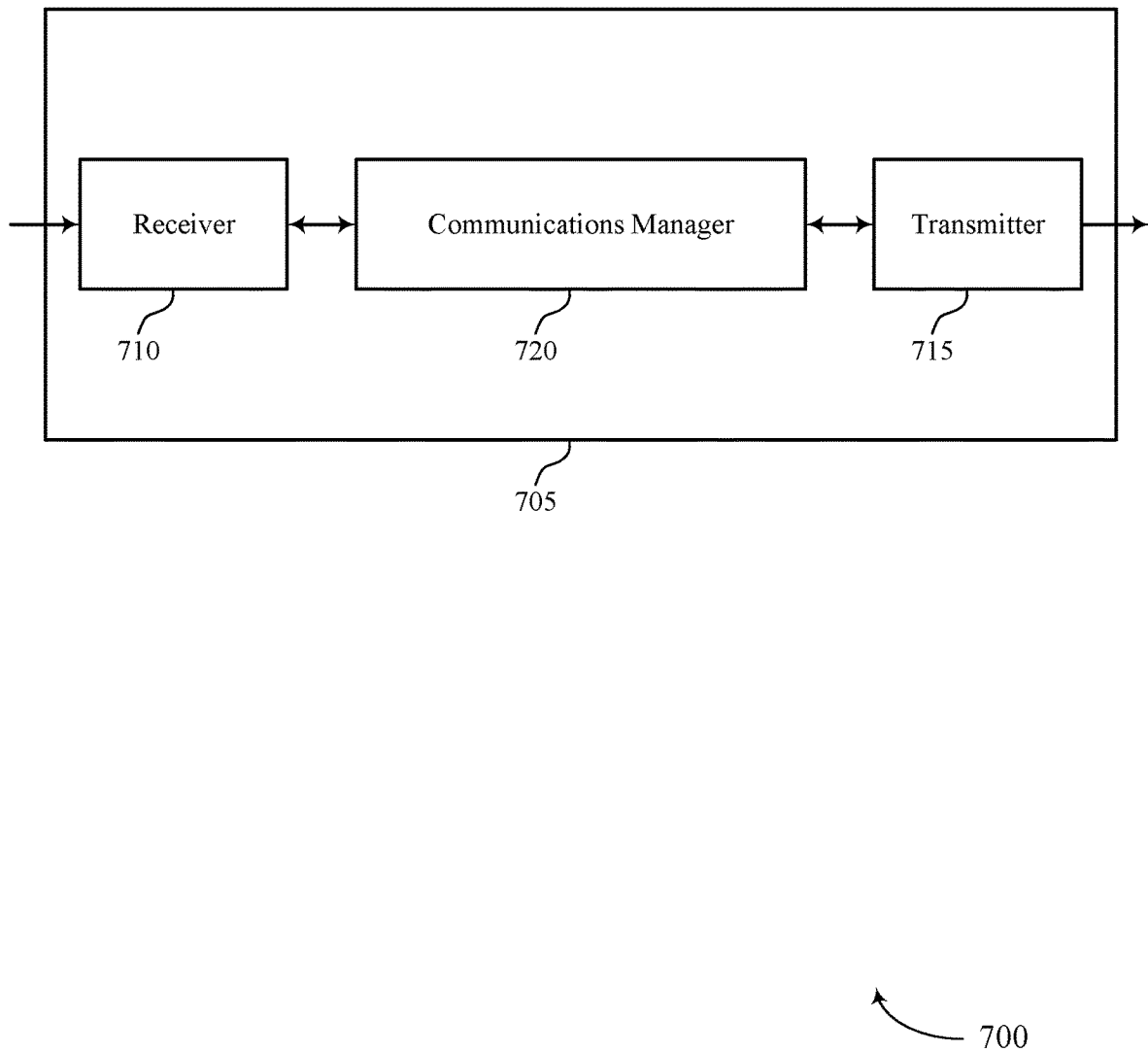
FIGS. 7 and 8 show block diagrams of devices that support uplink control information multiplexing techniques for uplink communications using multiple repetitions in accordance with aspects of the present disclosure.

FIG. 7 shows a block diagram 700 of a device 705 that supports uplink control information multiplexing techniques for uplink communications using multiple repetitions in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to uplink control information multiplexing techniques for uplink communications using multiple repetitions). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to uplink control information multiplexing techniques for uplink communications using multiple repetitions). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of uplink control information multiplexing techniques for uplink communications using multiple repetitions as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for receiving an uplink grant with a set of uplink resources for an uplink data transmission from the UE, where the uplink data transmission is to be transmitted in a set of repetitions, and at least a subset of the set of repetitions include uplink control information that is multiplexed with the uplink data transmission. The communications manager 720 may be configured as or otherwise support a means for transmitting the set of repetitions in the set of uplink resources, where a first subset of the set of uplink resources is for the uplink control information and a second subset of the set of uplink resources is for the uplink data transmission, and the first subset of uplink resources is determined for each of one or more repetitions in the subset of repetitions based on an offset value associated with uplink control information transmissions and a scaling factor applied to the offset value, where an amount of resources in the first subset of uplink resources is determined based on the offset value as scaled by the scaling factor, and where the scaling factor is based on one or more parameters associated with the set of repetitions, the uplink control information, or any combinations thereof.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for scaling an offset value that is used for determining UCI resources in multiplexed UCI and uplink data transmissions. The scaling of the offset value may provide improvements to reliability and efficiency in communications by providing increased the likelihood of successful decoding of uplink data and UCI with efficient signaling of uplink parameters. Such improvements may enhance efficiency of wireless communications by reducing latency and reducing a number of retransmissions, and provide for efficient signaling of the offset value according to established signaling techniques.

Figure 8:
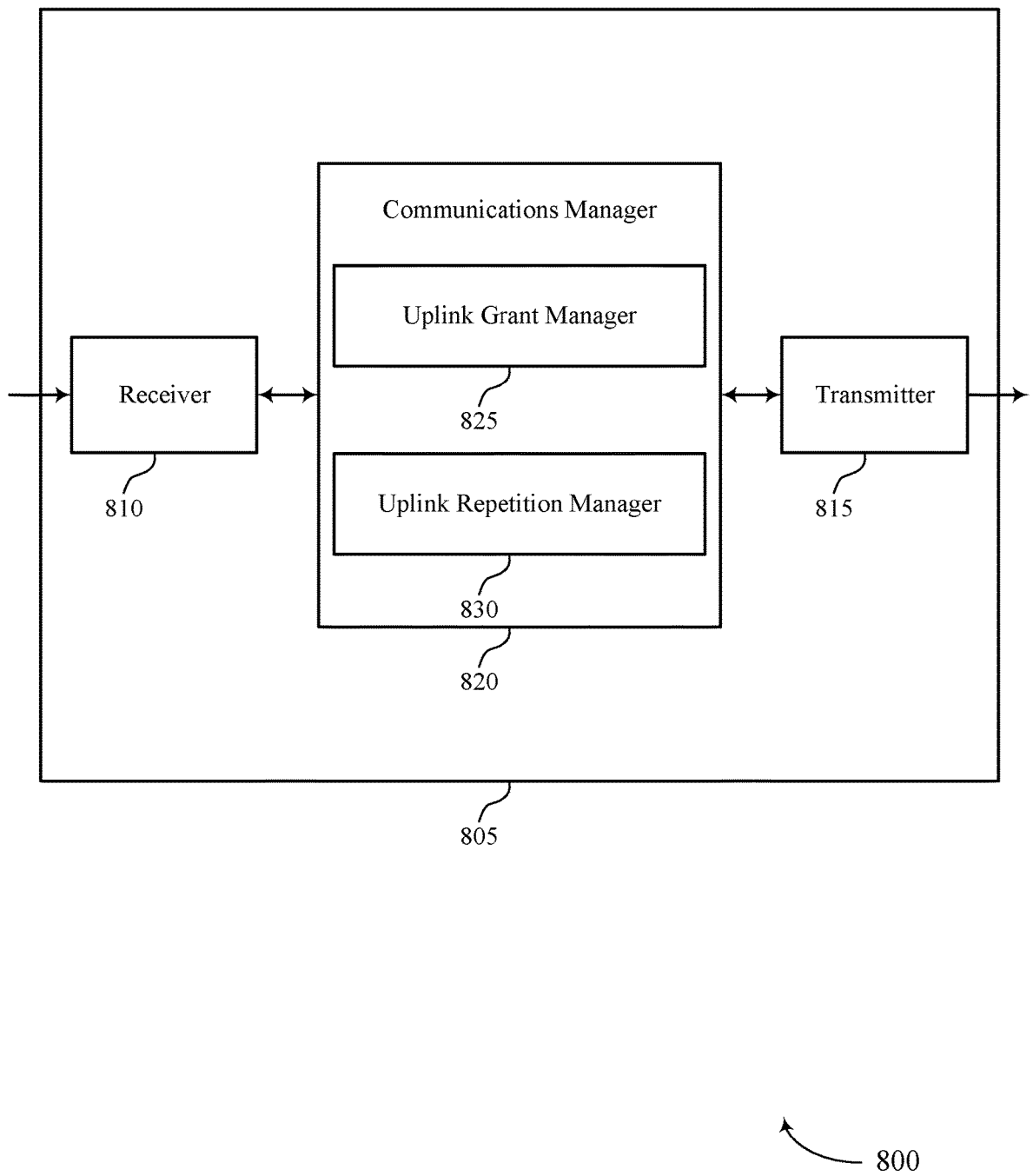

FIG. 8 shows a block diagram 800 of a device 805 that supports uplink control information multiplexing techniques for uplink communications using multiple repetitions in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to uplink control information multiplexing techniques for uplink communications using multiple repetitions). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to uplink control information multiplexing techniques for uplink communications using multiple repetitions). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of uplink control information multiplexing techniques for uplink communications using multiple repetitions as described herein. For example, the communications manager 820 may include an uplink grant manager 825 an uplink repetition manager 830, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The uplink grant manager 825 may be configured as or otherwise support a means for receiving an uplink grant with a set of uplink resources for an uplink data transmission from the UE, where the uplink data transmission is to be transmitted in a set of repetitions, and at least a subset of the set of repetitions include uplink control information that is multiplexed with the uplink data transmission. The uplink repetition manager 830 may be configured as or otherwise support a means for transmitting the set of repetitions in the set of uplink resources, where a first subset of the set of uplink resources is for the uplink control information and a second subset of the set of uplink resources is for the uplink data transmission, and the first subset of uplink resources is determined for each of one or more repetitions in the subset of repetitions based on an offset value associated with uplink control information transmissions and a scaling factor applied to the offset value, where an amount of resources in the first subset of uplink resources is determined based on the offset value as scaled by the scaling factor, and where the scaling factor is based on one or more parameters associated with the set of repetitions, the uplink control information, or any combinations thereof.

Figure 9:
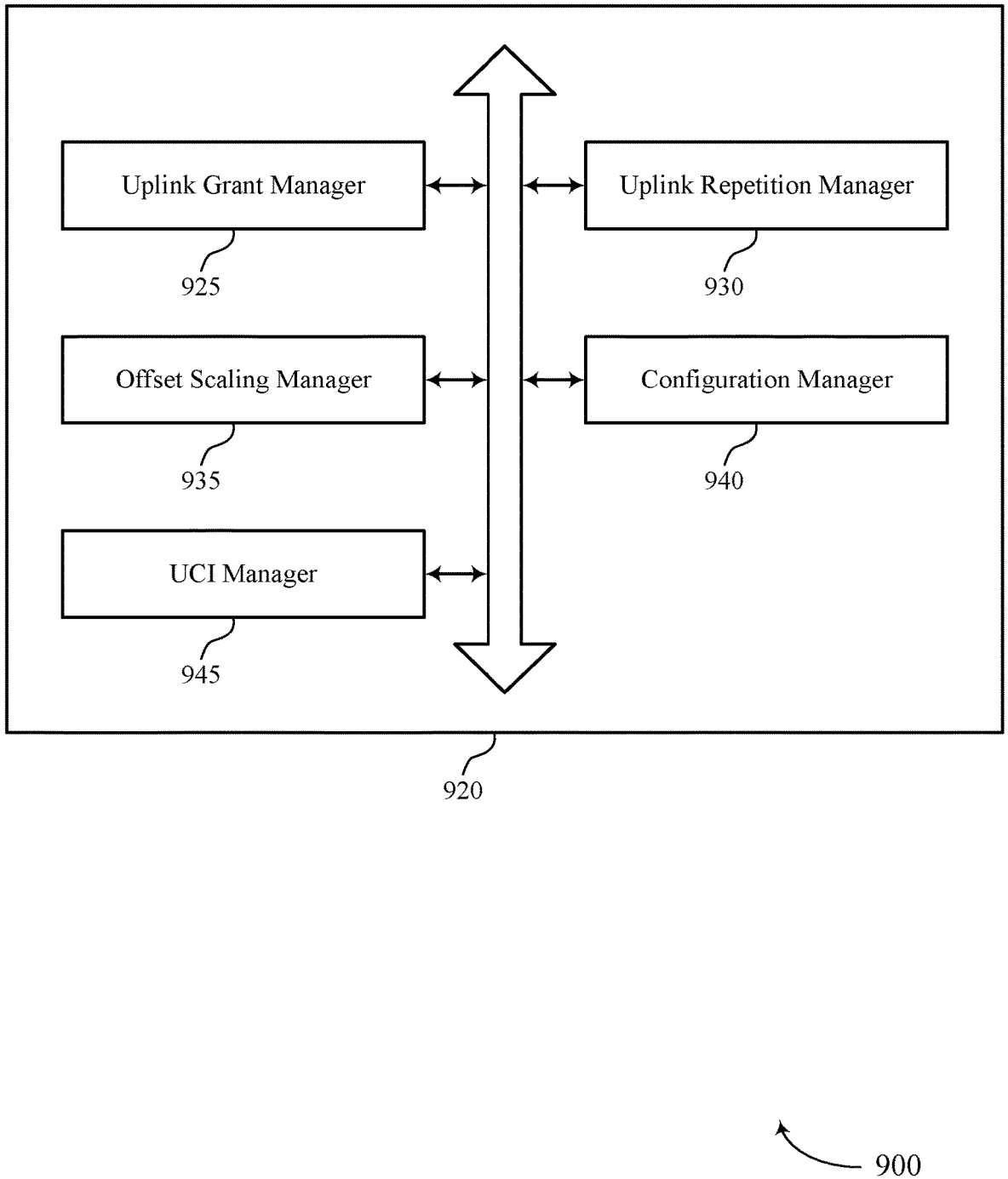
FIG. 9 shows a block diagram of a communications manager that supports uplink control information multiplexing techniques for uplink communications using multiple repetitions in accordance with aspects of the present disclosure.

FIG. 9 shows a block diagram 900 of a communications manager 920 that supports uplink control information multiplexing techniques for uplink communications using multiple repetitions in accordance with aspects of the present disclosure. The communications manager 920 may be an example of aspects of a communications manager 720, a communications manager 820, or both, as described herein. The communications manager 920, or various components thereof, may be an example of means for performing various aspects of uplink control information multiplexing techniques for uplink communications using multiple repetitions as described herein. For example, the communications manager 920 may include an uplink grant manager 925, an uplink repetition manager 930, an offset scaling manager 935, a configuration manager 940, a UCI manager 945, or any combination thereof. Each of these components may communicate, directly or indirectly, with one another (e.g., via one or more buses).

The communications manager 920 may support wireless communication at a UE in accordance with examples as disclosed herein. The uplink grant manager 925 may be configured as or otherwise support a means for receiving an uplink grant with a set of uplink resources for an uplink data transmission from the UE, where the uplink data transmission is to be transmitted in a set of repetitions, and at least a subset of the set of repetitions include uplink control information that is multiplexed with the uplink data transmission. The uplink repetition manager 930 may be configured as or otherwise support a means for transmitting the set of repetitions in the set of uplink resources, where a first subset of the set of uplink resources is for the uplink control information and a second subset of the set of uplink resources is for the uplink data transmission, and the first subset of uplink resources is determined for each of one or more repetitions in the subset of repetitions based on an offset value associated with uplink control information transmissions and a scaling factor applied to the offset value, where an amount of resources in the first subset of uplink resources is determined based on the offset value as scaled by the scaling factor, and where the scaling factor is based on one or more parameters associated with the set of repetitions, the uplink control information, or any combinations thereof.

In some examples, the offset scaling manager 935 may be configured as or otherwise support a means for receiving the offset value in downlink control information or in configuration signaling, where the offset value provides a spectral efficiency ratio of the uplink data transmission to the uplink control information, and the scaling factor provides a scaled spectral efficiency ratio of the uplink data transmission to the uplink control information that is based on the one or more parameters. In some examples, the scaling factor is determined separately for each repetition in the subset of the set of repetitions.

In some examples, a first repetition of the subset of repetitions includes a first type of uplink control information and a second repetition of the subset of repetitions includes a second type of uplink control information, and where the scaling factor is determined separately for the first type of uplink control information and the second type of uplink control information. In some examples, the scaling factor is based on a number of uplink data transmission repetitions in the set of repetitions, a quantity of uplink data transmission repetitions in the set of repetitions without uplink control information multiplexed therewith, or any combinations thereof. In some examples, the scaling factor is based on a number of the subset of repetitions on which a particular uplink control information is multiplexed. In some examples, the offset value is scaled by the scaling factor to provide a total number of resource elements across the subset of repetitions that is equal to a number of resource elements that would be used if the uplink control information were to be multiplexed with a single repetition of the uplink data transmission.

In some examples, the configuration manager 940 may be configured as or otherwise support a means for receiving configuration information for two or more uplink reference signal resource sets, and where the scaling factor is based on whether the subset of repetitions are associated with a single uplink reference signal resource set or multiple uplink reference signal resource sets. In some examples, the scaling factor is based on a type of information included in the uplink control information. In some examples, the type of information included in the uplink control information includes one or more of periodic CSI, aperiodic CSI, semi-persistent CSI, acknowledgment/negative-acknowledgment feedback information, or any combinations thereof. In some examples, the scaling factor is based on a reliability target associated with the uplink control information.

Figure 10:
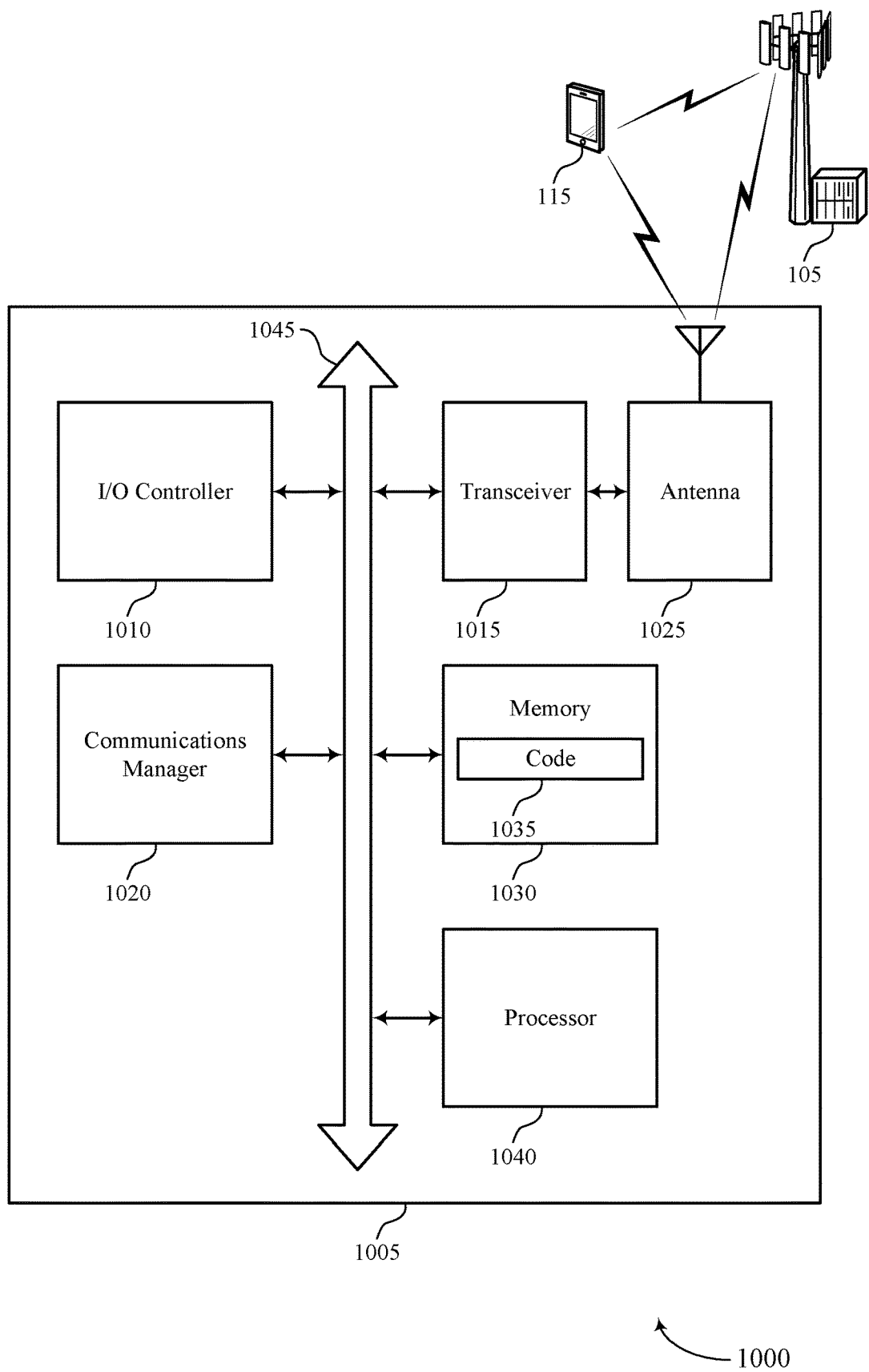
FIG. 10 shows a diagram of a system including a device that supports uplink control information multiplexing techniques for uplink communications using multiple repetitions in accordance with aspects of the present disclosure.

FIG. 10 shows a diagram of a system 1000 including a device 1005 that supports uplink control information multiplexing techniques for uplink communications using multiple repetitions in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting uplink control information multiplexing techniques for uplink communications using multiple repetitions). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving an uplink grant with a set of uplink resources for an uplink data transmission from the UE, where the uplink data transmission is to be transmitted in a set of repetitions, and at least a subset of the set of repetitions include uplink control information that is multiplexed with the uplink data transmission. The communications manager 1020 may be configured as or otherwise support a means for transmitting the set of repetitions in the set of uplink resources, where a first subset of the set of uplink resources is for the uplink control information and a second subset of the set of uplink resources is for the uplink data transmission, and the first subset of uplink resources is determined for each of one or more repetitions in the subset of repetitions based on an offset value associated with uplink control information transmissions and a scaling factor applied to the offset value, where an amount of resources in the first subset of uplink resources is determined based on the offset value as scaled by the scaling factor, and where the scaling factor is based on one or more parameters associated with the set of repetitions, the uplink control information, or any combinations thereof.

By including or configuring the communications manager 1020 in accordance with examples as described herein, the device 1005 may support techniques for scaling an offset value that is used for determining UCI resources in multiplexed UCI and uplink data transmissions. The scaling of the offset value may provide improvements to reliability and efficiency in communications by providing increased the likelihood of successful decoding of uplink data and UCI with efficient signaling of uplink parameters. Such improvements may enhance efficiency of wireless communications by reducing latency and reducing a number of retransmissions, and provide for efficient signaling of the offset value according to established signaling techniques.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of uplink control information multiplexing techniques for uplink communications using multiple repetitions as described herein, or the processor 1040 and the memory 1030 may be otherwise configured to perform or support such operations.

Figure 11:
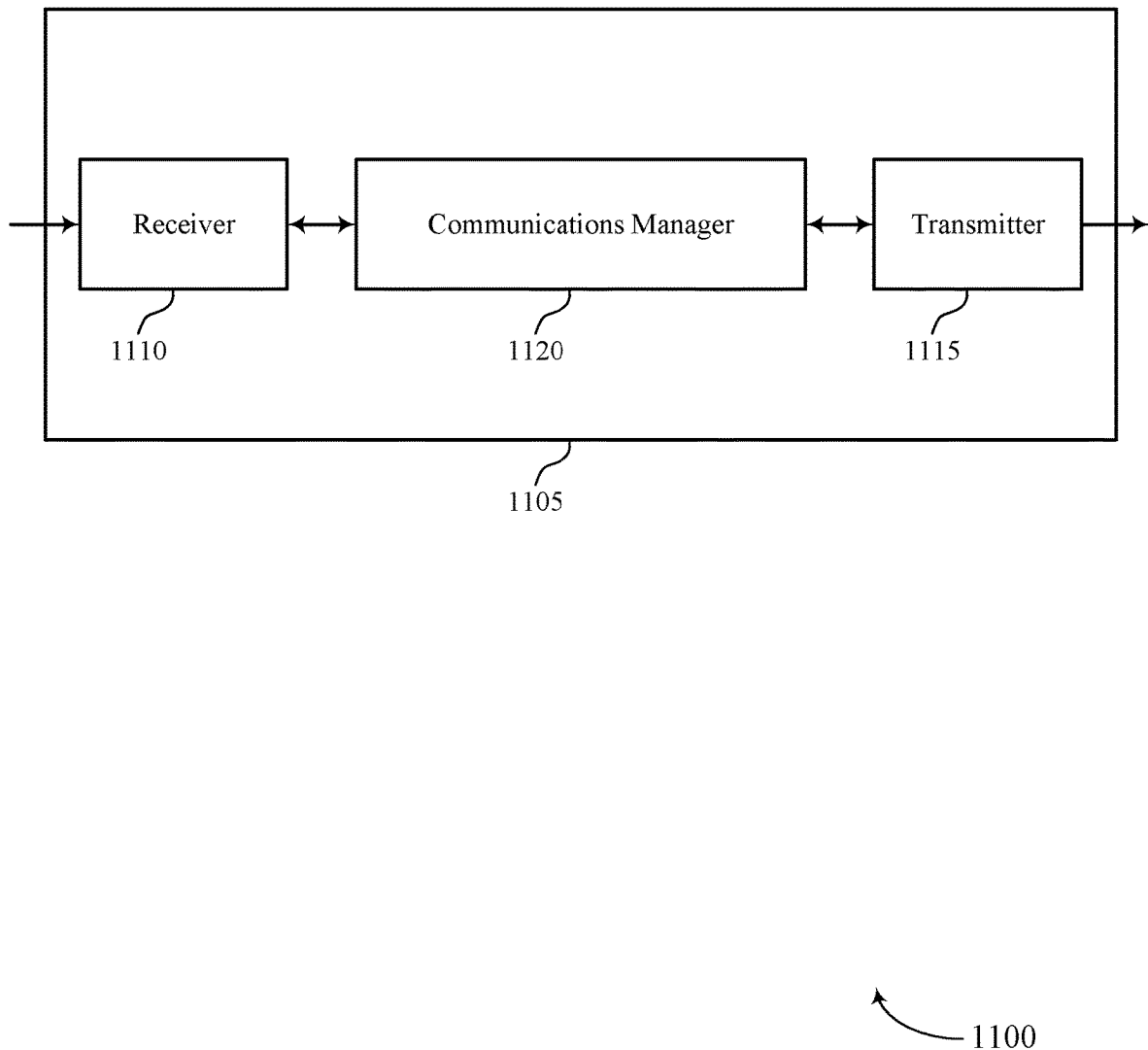
FIGS. 11 and 12 show block diagrams of devices that support uplink control information multiplexing techniques for uplink communications using multiple repetitions in accordance with aspects of the present disclosure.

FIG. 11 shows a block diagram 1100 of a device 1105 that supports uplink control information multiplexing techniques for uplink communications using multiple repetitions in accordance with aspects of the present disclosure. The device 1105 may be an example of aspects of a base station 105 or access network entity as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to uplink control information multiplexing techniques for uplink communications using multiple repetitions). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to uplink control information multiplexing techniques for uplink communications using multiple repetitions). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of uplink control information multiplexing techniques for uplink communications using multiple repetitions as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at an access network entity in accordance with examples as disclosed herein. For example, the communications manager 1120 may be configured as or otherwise support a means for transmitting, to a UE, an uplink grant with a set of uplink resources for an uplink data transmission from the UE to the access network entity, where the uplink data transmission is to be transmitted in a set of repetitions, and at least a subset of the set of repetitions include uplink control information. The communications manager 1120 may be configured as or otherwise support a means for receiving the set of repetitions in the set of uplink resources, where a first subset of the set of uplink resources includes the uplink control information and a second subset of the set of uplink resources includes the uplink data transmission, and the first subset of uplink resources is determined for each of one or more repetitions in the subset of repetitions based on an offset value associated with uplink control information transmissions and a scaling factor applied to the offset value, where an amount of resources in the first subset of uplink resources is determined based on the offset value as scaled by the scaling factor, and where the scaling factor is based on one or more parameters associated with the set of repetitions, the uplink control information, or any combinations thereof.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for scaling an offset value that is used for determining UCI resources in multiplexed UCI and uplink data transmissions. The scaling of the offset value may provide improvements to reliability and efficiency in communications by providing increased the likelihood of successful decoding of uplink data and UCI with efficient signaling of uplink parameters. Such improvements may enhance efficiency of wireless communications by reducing latency and reducing a number of retransmissions, and provide for efficient signaling of the offset value according to established signaling techniques.

Figure 12:
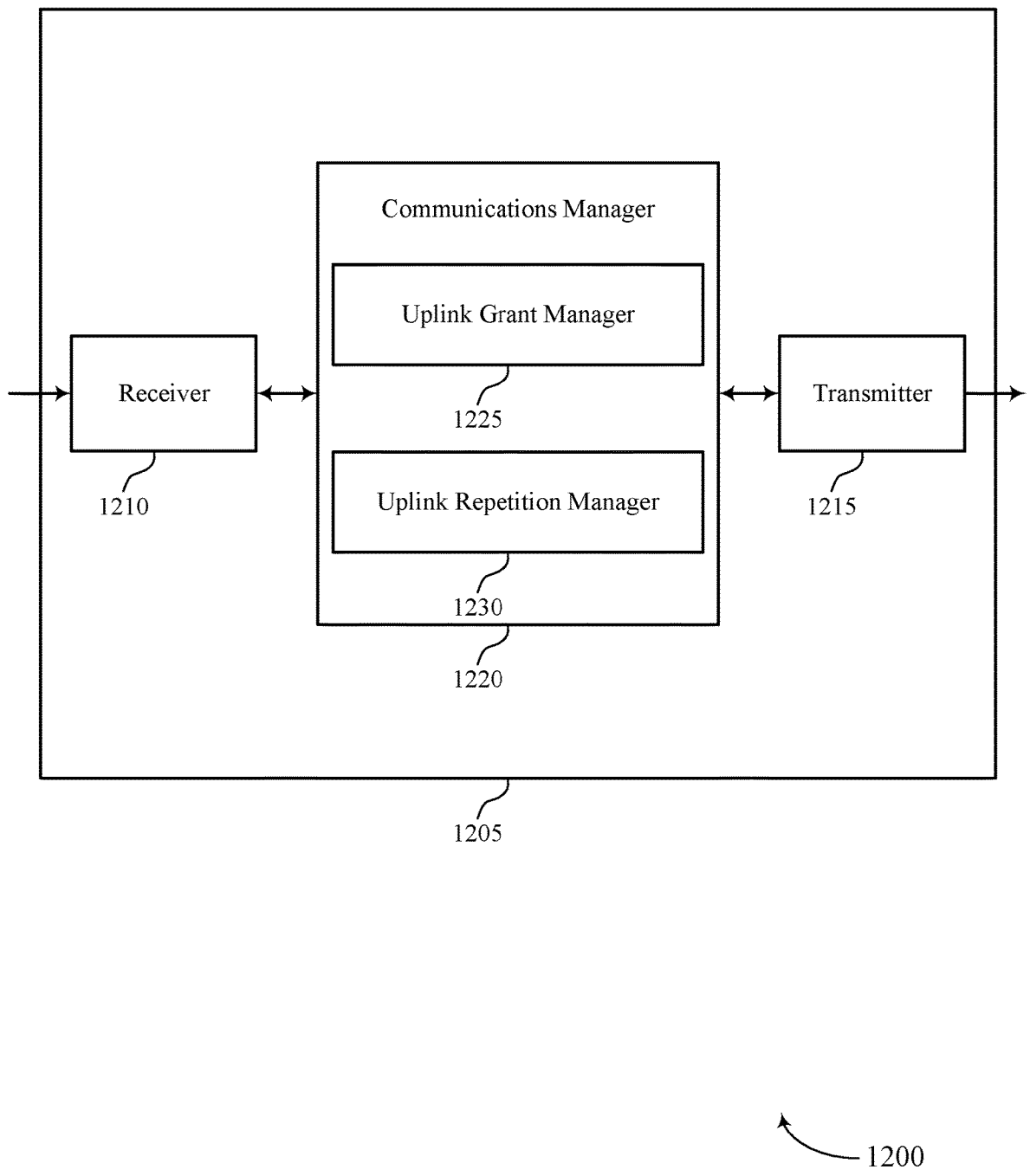

FIG. 12 shows a block diagram 1200 of a device 1205 that supports uplink control information multiplexing techniques for uplink communications using multiple repetitions in accordance with aspects of the present disclosure. The device 1205 may be an example of aspects of a device 1105 a base station 105, or an access network entity, as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to uplink control information multiplexing techniques for uplink communications using multiple repetitions). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to uplink control information multiplexing techniques for uplink communications using multiple repetitions). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of uplink control information multiplexing techniques for uplink communications using multiple repetitions as described herein. For example, the communications manager 1220 may include an uplink grant manager 1225 an uplink repetition manager 1230, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at an access network entity in accordance with examples as disclosed herein. The uplink grant manager 1225 may be configured as or otherwise support a means for transmitting, to a UE, an uplink grant with a set of uplink resources for an uplink data transmission from the UE to the access network entity, where the uplink data transmission is to be transmitted in a set of repetitions, and at least a subset of the set of repetitions include uplink control information. The uplink repetition manager 1230 may be configured as or otherwise support a means for receiving the set of repetitions in the set of uplink resources, where a first subset of the set of uplink resources includes the uplink control information and a second subset of the set of uplink resources includes the uplink data transmission, and the first subset of uplink resources is determined for each of one or more repetitions in the subset of repetitions based on an offset value associated with uplink control information transmissions and a scaling factor applied to the offset value, where an amount of resources in the first subset of uplink resources is determined based on the offset value as scaled by the scaling factor, and where the scaling factor is based on one or more parameters associated with the set of repetitions, the uplink control information, or any combinations thereof.

Figure 13:
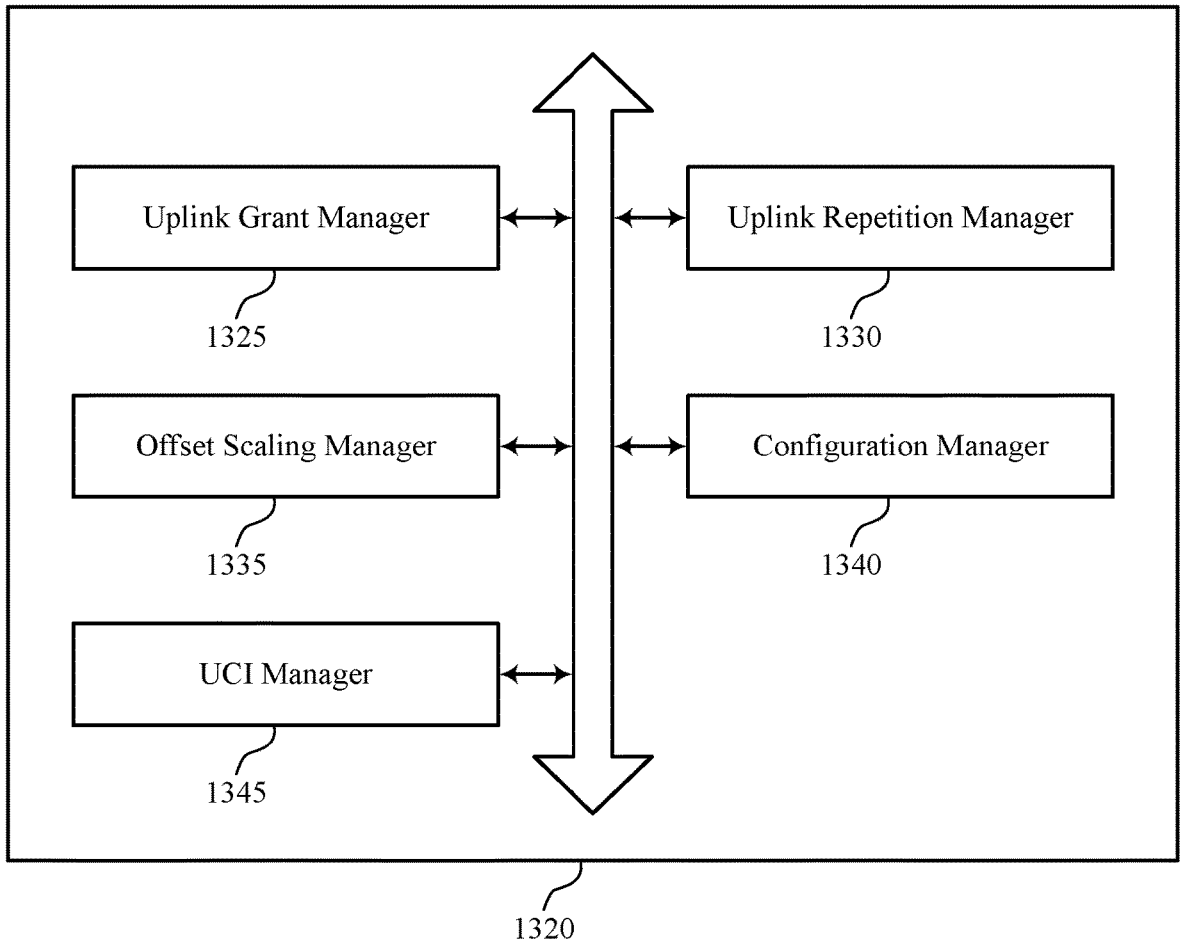
FIG. 13 shows a block diagram of a communications manager that supports uplink control information multiplexing techniques for uplink communications using multiple repetitions in accordance with aspects of the present disclosure.

FIG. 13 shows a block diagram 1300 of a communications manager 1320 that supports uplink control information multiplexing techniques for uplink communications using multiple repetitions in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of uplink control information multiplexing techniques for uplink communications using multiple repetitions as described herein. For example, the communications manager 1320 may include an uplink grant manager 1325, an uplink repetition manager 1330, an offset scaling manager 1335, a configuration manager 1340, a UCI manager 1345, or any combination thereof. Each of these components may communicate, directly or indirectly, with one another (e.g., via one or more buses).

The communications manager 1320 may support wireless communication at an access network entity in accordance with examples as disclosed herein. The uplink grant manager 1325 may be configured as or otherwise support a means for transmitting, to a UE, an uplink grant with a set of uplink resources for an uplink data transmission from the UE to the access network entity, where the uplink data transmission is to be transmitted in a set of repetitions, and at least a subset of the set of repetitions include uplink control information. The uplink repetition manager 1330 may be configured as or otherwise support a means for receiving the set of repetitions in the set of uplink resources, where a first subset of the set of uplink resources includes the uplink control information and a second subset of the set of uplink resources includes the uplink data transmission, and the first subset of uplink resources is determined for each of one or more repetitions in the subset of repetitions based on an offset value associated with uplink control information transmissions and a scaling factor applied to the offset value, where an amount of resources in the first subset of uplink resources is determined based on the offset value as scaled by the scaling factor, and where the scaling factor is based on one or more parameters associated with the set of repetitions, the uplink control information, or any combinations thereof.

In some examples, the offset scaling manager 1335 may be configured as or otherwise support a means for signaling the offset value to the UE via downlink control information or in configuration signaling, where the offset value provides a spectral efficiency ratio of the uplink data transmission to the uplink control information, and the scaling factor provides a scaled spectral efficiency ratio of the uplink data transmission to the uplink control information that is based on the one or more parameters. In some examples, the scaling factor is determined separately for each repetition in the subset of the set of repetitions. In some examples, a first repetition of the subset of repetitions includes a first type of uplink control information and a second repetition of the subset of repetitions includes a second type of uplink control information, and where the scaling factor is determined separately for the first type of uplink control information and the second type of uplink control information.

In some examples, the scaling factor is based on a number of uplink data transmission repetitions in the set of repetitions, a quantity of uplink data transmission repetitions in the set of repetitions without uplink control information multiplexed therewith, or any combinations thereof. In some examples, the scaling factor is based on a number of the subset of repetitions on which a particular uplink control information is multiplexed. In some examples, the offset value is scaled by the scaling factor to provide a total number of resource elements across the subset of repetitions that is equal to a number of resource elements that would be used if the uplink control information were to be multiplexed with a single repetition of the uplink data transmission.

In some examples, the configuration manager 1340 may be configured as or otherwise support a means for configuring the UE with two or more uplink reference signal resource sets, and where the scaling factor is based on whether the subset of repetitions are associated with a single uplink reference signal resource set or multiple uplink reference signal resource sets. In some examples, the scaling factor is based on a type of information included in the uplink control information. In some examples, the type of information included in the uplink control information includes one or more of periodic CSI, aperiodic CSI, semi-persistent CSI, acknowledgment/negative-acknowledgment feedback information, or any combinations thereof. In some examples, the scaling factor is based on a reliability target associated with the uplink control information.

Figure 14:
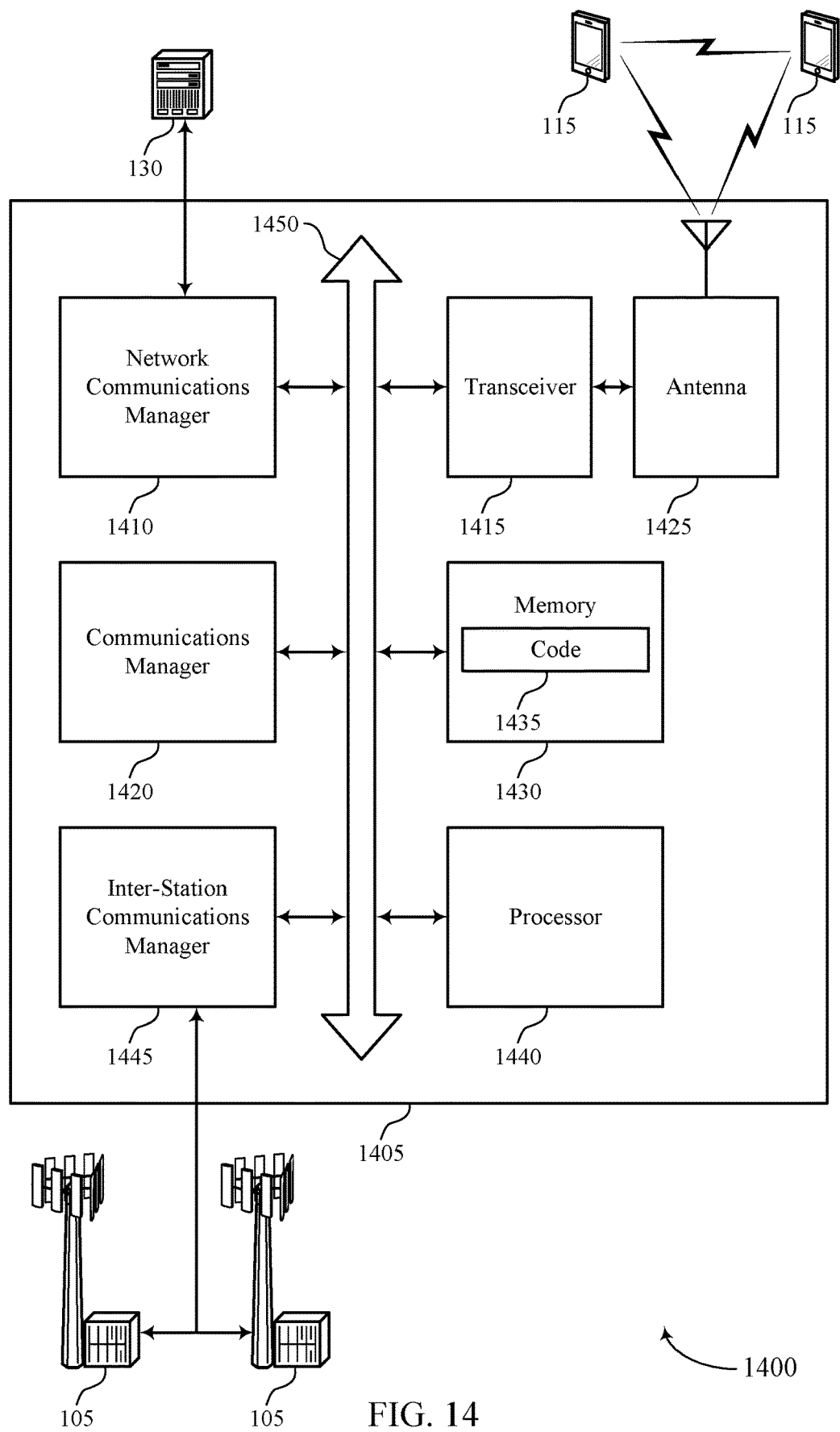
FIG. 14 shows a diagram of a system including a device that supports uplink control information multiplexing techniques for uplink communications using multiple repetitions in accordance with aspects of the present disclosure.

FIG. 14 shows a diagram of a system 1400 including a device 1405 that supports uplink control information multiplexing techniques for uplink communications using multiple repetitions in accordance with aspects of the present disclosure. The device 1405 may be an example of or include the components of a device 1105, a device 1205, a base station 105, or an access network entity, as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting uplink control information multiplexing techniques for uplink communications using multiple repetitions). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105 or access network entities, and may include a controller or scheduler for controlling communications with UEs 115 in cooperation with other base stations 105. For example, the inter-station communications manager 1445 may coordinate scheduling for transmissions to UEs 115 for various inter-ference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at an access network entity in accordance with examples as disclosed herein. For example, the communications manager 1420 may be configured as or otherwise support a means for transmitting, to a UE, an uplink grant with a set of uplink resources for an uplink data transmission from the UE to the access network entity, where the uplink data transmission is to be transmitted in a set of repetitions, and at least a subset of the set of repetitions include uplink control information. The communications manager 1420 may be configured as or otherwise support a means for receiving the set of repetitions in the set of uplink resources, where a first subset of the set of uplink resources includes the uplink control information and a second subset of the set of uplink resources includes the uplink data transmission, and the first subset of uplink resources is determined for each of one or more repetitions in the subset of repetitions based on an offset value associated with uplink control information transmissions and a scaling factor applied to the offset value, where an amount of resources in the first subset of uplink resources is determined based on the offset value as scaled by the scaling factor, and where the scaling factor is based on one or more parameters associated with the set of repetitions, the uplink control information, or any combinations thereof.

By including or configuring the communications manager 1420 in accordance with examples as described herein, the device 1405 may support techniques for scaling an offset value that is used for determining UCI resources in multiplexed UCI and uplink data transmissions. The scaling of the offset value may provide improvements to reliability and efficiency in communications by providing increased the likelihood of successful decoding of uplink data and UCI with efficient signaling of uplink parameters. Such improvements may enhance efficiency of wireless communications by reducing latency and reducing a number of retransmissions, and provide for efficient signaling of the offset value according to established signaling techniques.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of uplink control information multiplexing techniques for uplink communications using multiple repetitions as described herein, or the processor 1440 and the memory 1430 may be otherwise configured to perform or support such operations.

Figure 15:
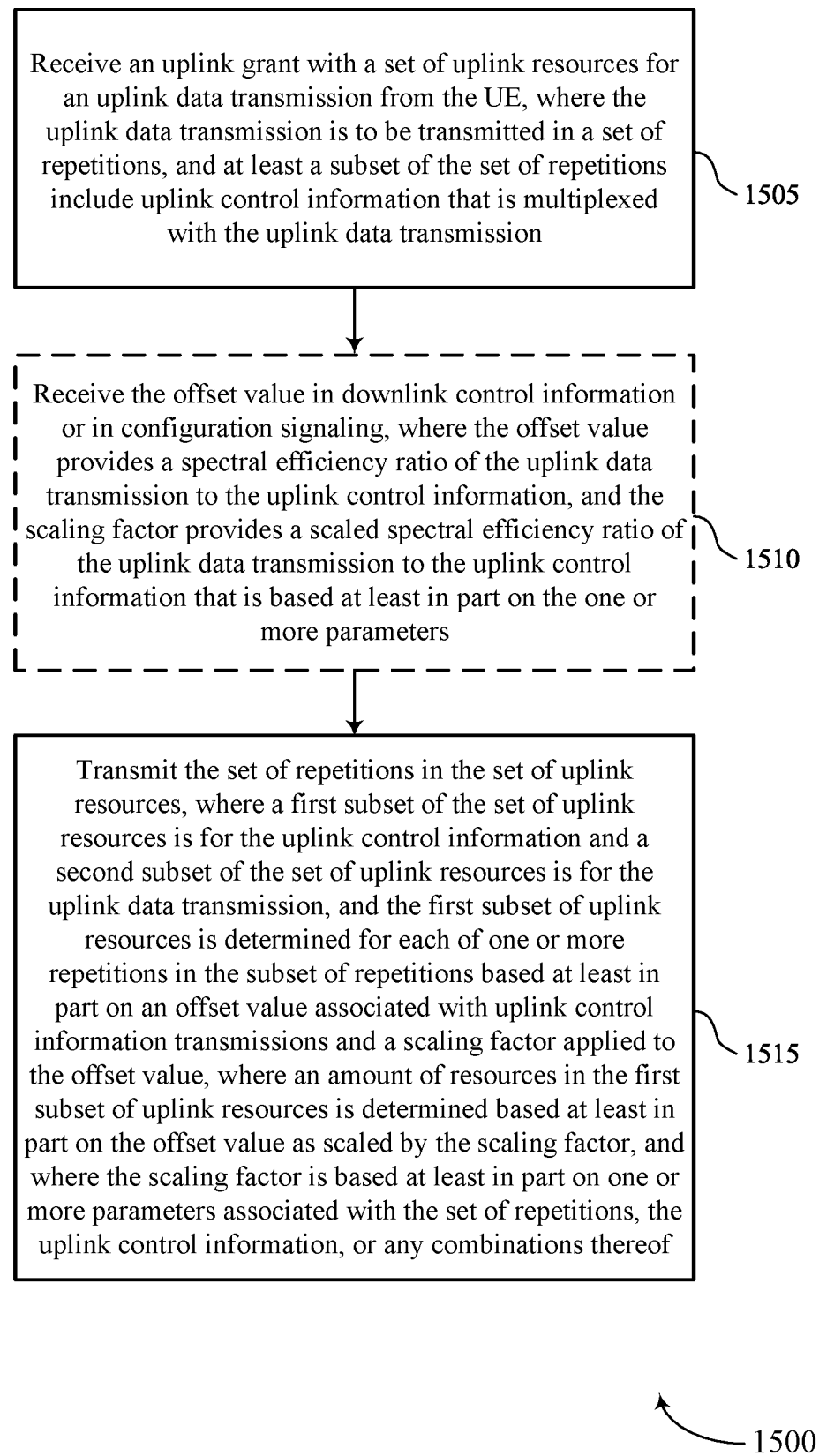
FIGS. 15 through 18 show flowcharts illustrating methods that support uplink control information multiplexing techniques for uplink communications using multiple repetitions in accordance with aspects of the present disclosure.

FIG. 15 shows a flowchart illustrating a method 1500 that supports uplink control information multiplexing techniques for uplink communications using multiple repetitions in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving an uplink grant with a set of uplink resources for an uplink data transmission from the UE, where the uplink data transmission is to be transmitted in a set of repetitions, and at least a subset of the set of repetitions include uplink control information that is multiplexed with the uplink data transmission. The operations of 1505 may be performed in accordance with examples as disclosed herein. In some examples, aspects of the operations of 1505 may be performed by an uplink grant manager 925 as described with reference to FIG. 9.

Optionally, at 1510, the method may include receiving the offset value in downlink control information or in configuration signaling, where the offset value provides a spectral efficiency ratio of the uplink data transmission to the uplink control information, and the scaling factor provides a scaled spectral efficiency ratio of the uplink data transmission to the uplink control information that is based on the one or more parameters. The operations of 1510 may be performed in accordance with examples as disclosed herein. In some examples, aspects of the operations of 1510 may be performed by an offset scaling manager 935 as described with reference to FIG. 9.

At 1515, the method may include transmitting the set of repetitions in the set of uplink resources, where a first subset of the set of uplink resources is for the uplink control information and a second subset of the set of uplink resources is for the uplink data transmission, and the first subset of uplink resources is determined for each of one or more repetitions in the subset of repetitions based on an offset value associated with uplink control information transmissions and a scaling factor applied to the offset value, where an amount of resources in the first subset of uplink resources is determined based on the offset value as scaled by the scaling factor, and where the scaling factor is based on one or more parameters associated with the set of repetitions, the uplink control information, or any combinations thereof. The operations of 1515 may be performed in accordance with examples as disclosed herein. In some examples, aspects of the operations of 1515 may be performed by an uplink repetition manager 930 as described with reference to FIG. 9.

Figure 16:
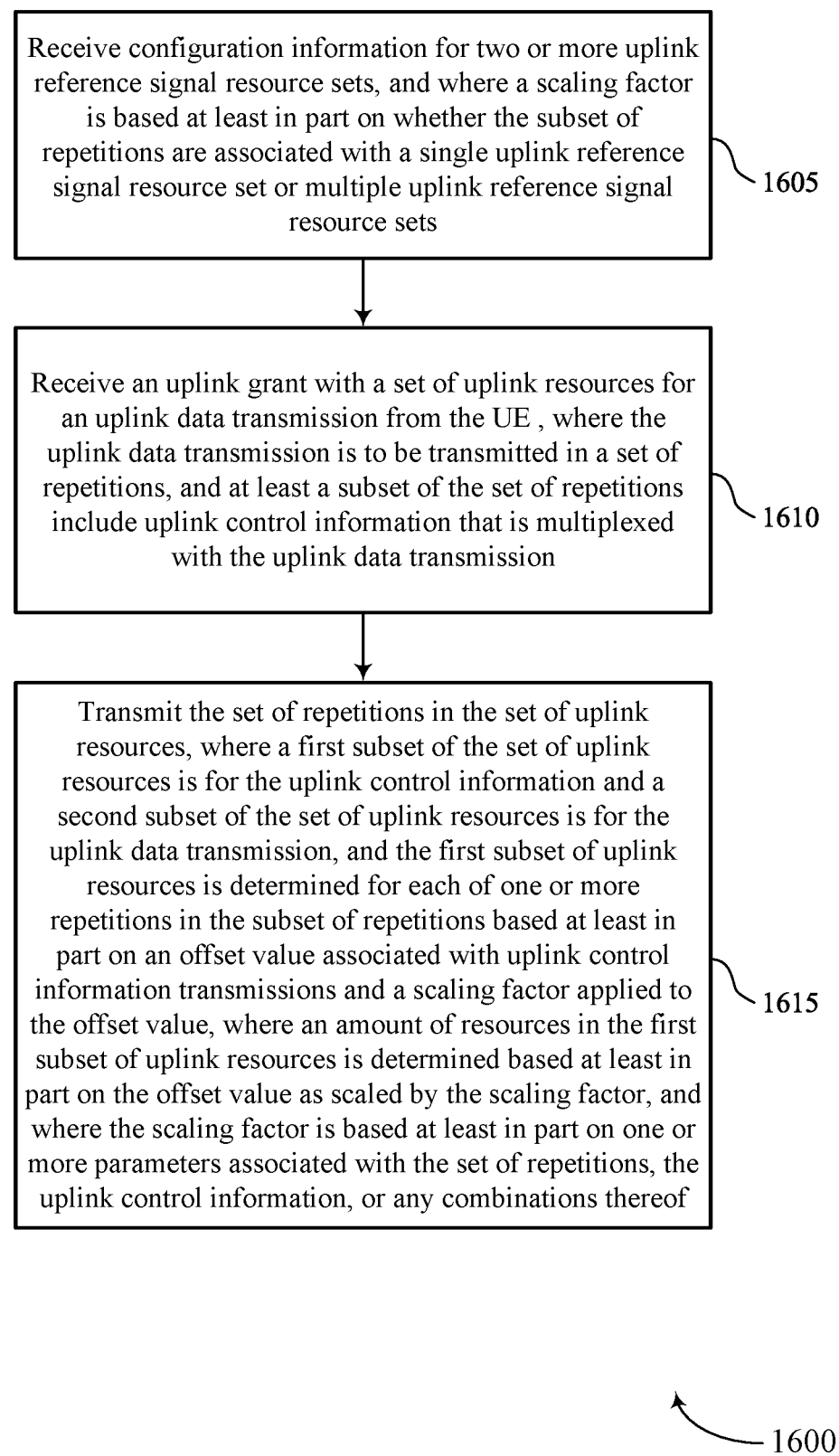

FIG. 16 shows a flowchart illustrating a method 1600 that supports uplink control information multiplexing techniques for uplink communications using multiple repetitions in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving configuration information for two or more uplink reference signal resource sets, and where a scaling factor is based on whether the subset of repetitions are associated with a single uplink reference signal resource set or multiple uplink reference signal resource sets. The operations of 1605 may be performed in accordance with examples as disclosed herein. In some examples, aspects of the operations of 1605 may be performed by a configuration manager 940 as described with reference to FIG. 9.

At 1610, the method may include receiving an uplink grant with a set of uplink resources for an uplink data transmission from the UE, where the uplink data transmission is to be transmitted in a set of repetitions, and at least a subset of the set of repetitions include uplink control information that is multiplexed with the uplink data transmission. The operations of 1610 may be performed in accordance with examples as disclosed herein. In some examples, aspects of the operations of 1610 may be performed by an uplink grant manager 925 as described with reference to FIG. 9.

At 1615, the method may include transmitting the set of repetitions in the set of uplink resources, where a first subset of the set of uplink resources is for the uplink control information and a second subset of the set of uplink resources is for the uplink data transmission, and the first subset of uplink resources is determined for each of one or more repetitions in the subset of repetitions based on an offset value associated with uplink control information transmissions and a scaling factor applied to the offset value, where an amount of resources in the first subset of uplink resources is determined based on the offset value as scaled by the scaling factor, and where the scaling factor is based on one or more parameters associated with the set of repetitions, the uplink control information, or any combinations thereof. The operations of 1615 may be performed in accordance with examples as disclosed herein. In some examples, aspects of the operations of 1615 may be performed by an uplink repetition manager 930 as described with reference to FIG. 9.

Figure 17:
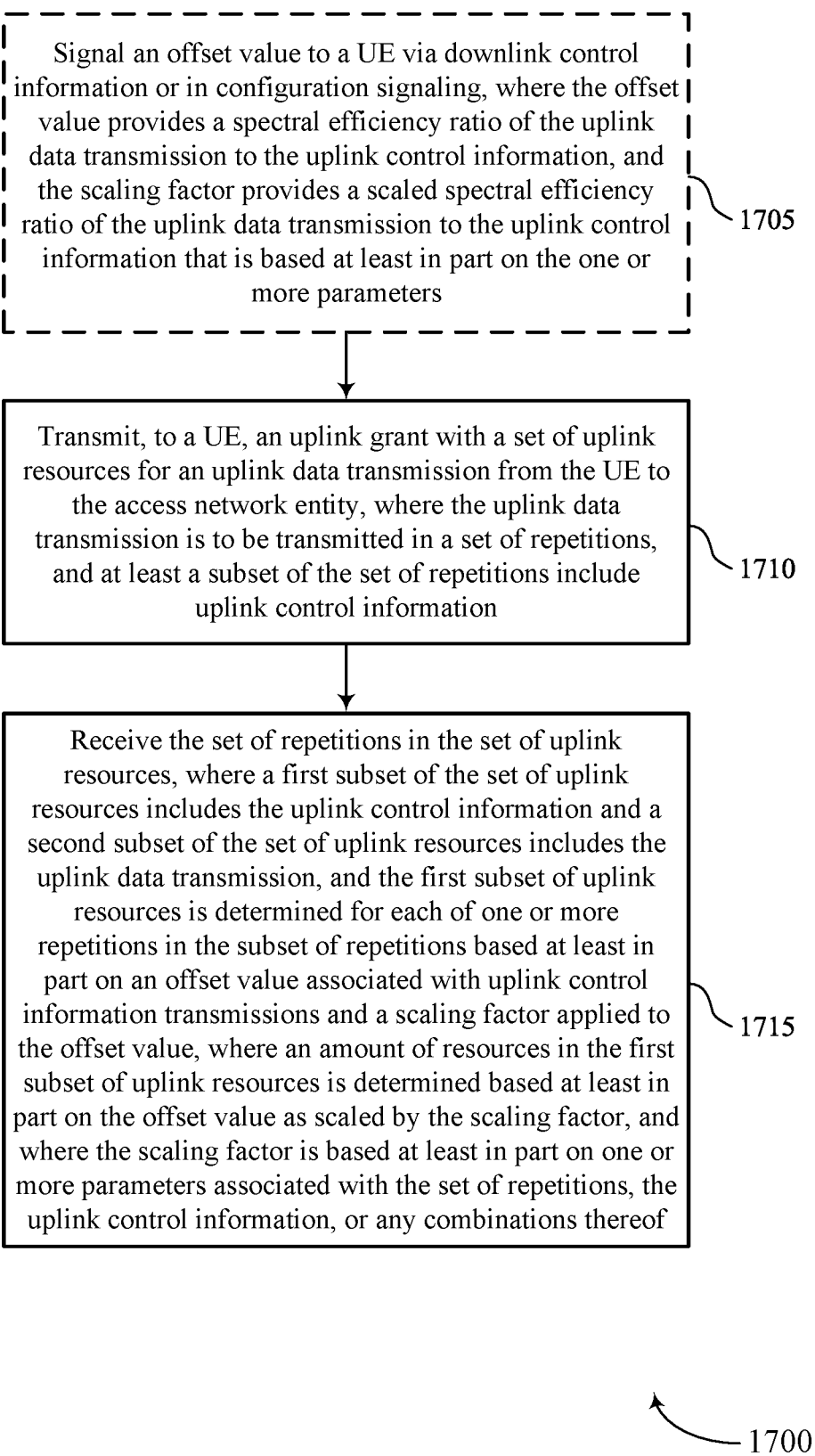

FIG. 17 shows a flowchart illustrating a method 1700 that supports uplink control information multiplexing techniques for uplink communications using multiple repetitions in accordance with aspects of the present disclosure. The operations of the method 1700 may be implemented by a base station, an access network entity, or components thereof as described herein. For example, the operations of the method 1700 may be performed by a base station 105 or access network entity 140 as described with reference to FIGS. 1 through 6 and 11 through 14. In some examples, a base station may execute a set of instructions to control the functional elements of the base station or access network entity to perform the described functions. Additionally or alternatively, the base station or access network entity may perform aspects of the described functions using special-purpose hardware.

Optionally, at 1705, the method may include signaling an offset value to a UE via downlink control information or in configuration signaling, where the offset value provides a spectral efficiency ratio of an uplink data transmission to an uplink control information, and the scaling factor provides a scaled spectral efficiency ratio of the uplink data transmission to the uplink control information that is based on the one or more parameters. The operations of 1705 may be performed in accordance with examples as disclosed herein. In some examples, aspects of the operations of 1705 may be performed by an offset scaling manager 1335 as described with reference to FIG. 13.

At 1710, the method may include transmitting, to the UE, an uplink grant with a set of uplink resources for the uplink data transmission from the UE to the access network entity, where the uplink data transmission is to be transmitted in a set of repetitions, and at least a subset of the set of repetitions include uplink control information. The operations of 1710 may be performed in accordance with examples as disclosed herein. In some examples, aspects of the operations of 1710 may be performed by an uplink grant manager 1325 as described with reference to FIG. 13.

At 1715, the method may include receiving the set of repetitions in the set of uplink resources, where a first subset of the set of uplink resources includes the uplink control information and a second subset of the set of uplink resources includes the uplink data transmission, and the first subset of uplink resources is determined for each of one or more repetitions in the subset of repetitions based on an offset value associated with uplink control information transmissions and a scaling factor applied to the offset value, where an amount of resources in the first subset of uplink resources is determined based on the offset value as scaled by the scaling factor, and where the scaling factor is based on one or more parameters associated with the set of repetitions, the uplink control information, or any combinations thereof. The operations of 1715 may be performed in accordance with examples as disclosed herein. In some examples, aspects of the operations of 1715 may be performed by an uplink repetition manager 1330 as described with reference to FIG. 13.

Figure 18:
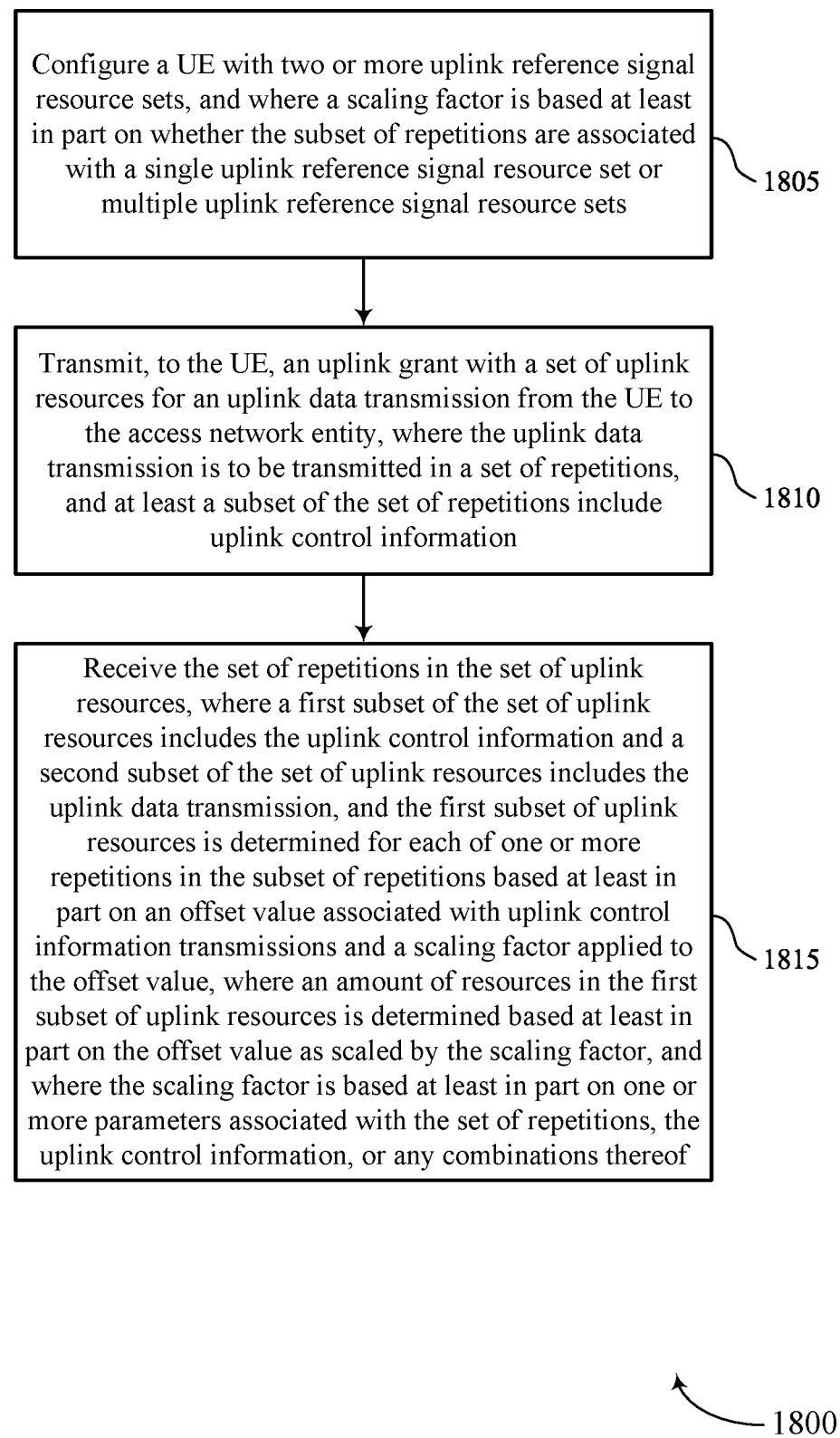

FIG. 18 shows a flowchart illustrating a method 1800 that supports uplink control information multiplexing techniques for uplink communications using multiple repetitions in accordance with aspects of the present disclosure. The operations of the method 1800 may be implemented by a base station, an access network entity, or components thereof as described herein. For example, the operations of the method 1800 may be performed by a base station 105 or access network entity 140 as described with reference to FIGS. 1 through 6 and 11 through 14. In some examples, a base station or access network entity may execute a set of instructions to control the functional elements of the base station or access network entity to perform the described functions. Additionally or alternatively, the base station or access network entity may perform aspects of the described functions using special-purpose hardware.

At 1805, the method may include configuring the UE with two or more uplink reference signal resource sets, and where the scaling factor is based on whether the subset of repetitions are associated with a single uplink reference signal resource set or multiple uplink reference signal resource sets. The operations of 1805 may be performed in accordance with examples as disclosed herein. In some examples, aspects of the operations of 1805 may be performed by a configuration manager 1340 as described with reference to FIG. 13.

At 1810, the method may include transmitting, to a UE, an uplink grant with a set of uplink resources for an uplink data transmission from the UE to the access network entity, where the uplink data transmission is to be transmitted in a set of repetitions, and at least a subset of the set of repetitions include uplink control information. The operations of 1810 may be performed in accordance with examples as disclosed herein. In some examples, aspects of the operations of 1810 may be performed by an uplink grant manager 1325 as described with reference to FIG. 13.

At 1815, the method may include receiving the set of repetitions in the set of uplink resources, where a first subset of the set of uplink resources includes the uplink control information and a second subset of the set of uplink resources includes the uplink data transmission, and the first subset of uplink resources is determined for each of one or more repetitions in the subset of repetitions based on an offset value associated with uplink control information transmissions and a scaling factor applied to the offset value, where an amount of resources in the first subset of uplink resources is determined based on the offset value as scaled by the scaling factor, and where the scaling factor is based on one or more parameters associated with the set of repetitions, the uplink control information, or any combinations thereof. The operations of 1815 may be performed in accordance with examples as disclosed herein. In some examples, aspects of the operations of 1815 may be performed by an uplink repetition manager 1330 as described with reference to FIG. 13.

The following provides an overview of aspects of the present disclosure:

Aspect 1: A method for wireless communication at a UE, comprising: receiving an uplink grant with a set of uplink resources for an uplink data transmission from the UE, wherein the uplink data transmission is to be transmitted in a set of repetitions, and at least a subset of the set of repetitions include uplink control information that is multiplexed with the uplink data transmission; and transmitting the set of repetitions in the set of uplink resources, wherein a first subset of the set of uplink resources is for the uplink control information and a second subset of the set of uplink resources is for the uplink data transmission, and the first subset of uplink resources is determined for each of one or more repetitions in the subset of repetitions based at least in part on an offset value associated with uplink control information transmissions and a scaling factor applied to the offset value, wherein an amount of resources in the first subset of uplink resources is determined based at least in part on the offset value as scaled by the scaling factor, and wherein the scaling factor is based at least in part on one or more parameters associated with the set of repetitions, the uplink control information, or any combinations thereof.

Aspect 2: The method of aspect 1, further comprising: receiving the offset value in downlink control information or in configuration signaling, wherein the offset value provides a spectral efficiency ratio of the uplink data transmission to the uplink control information, and the scaling factor provides a scaled spectral efficiency ratio of the uplink data transmission to the uplink control information that is based at least in part on the one or more parameters.

Aspect 3: The method of any of aspects 1 through 2, wherein the scaling factor is determined separately for each repetition in the subset of the set of repetitions.

Aspect 4: The method of any of aspects 1 through 3, wherein a first repetition of the subset of repetitions includes a first type of uplink control information and a second repetition of the subset of repetitions includes a second type of uplink control information, and wherein the scaling factor is determined separately for the first type of uplink control information and the second type of uplink control information.

Aspect 5: The method of any of aspects 1 through 4, wherein the scaling factor is based at least in part on a number of uplink data transmission repetitions in the set of repetitions, a quantity of uplink data transmission repetitions in the set of repetitions without uplink control information multiplexed therewith, or any combinations thereof.

Aspect 6: The method of any of aspects 1 through 5, wherein the scaling factor is based at least in part on a number of the subset of repetitions on which a particular uplink control information is multiplexed.

Aspect 7: The method of aspect 6, wherein the offset value is scaled by the scaling factor to provide a total number of resource elements across the subset of repetitions that is equal to a number of resource elements that would be used if the uplink control information were to be multiplexed with a single repetition of the uplink data transmission.

Aspect 8: The method of any of aspects 1 through 7, further comprising: receiving configuration information for two or more uplink reference signal resource sets, and wherein the scaling factor is based at least in part on whether the subset of repetitions are associated with a single uplink reference signal resource set or multiple uplink reference signal resource sets.

Aspect 9: The method of any of aspects 1 through 8, wherein the scaling factor is based at least in part on a type of information included in the uplink control information.

Aspect 10: The method of aspect 9, wherein the type of information included in the uplink control information includes one or more of periodic CSI, aperiodic CSI, semi-persistent CSI, acknowledgment/negative-acknowledgment feedback information, or any combinations thereof.

Aspect 11: The method of any of aspects 1 through 10, wherein the scaling factor is based at least in part on a reliability target associated with the uplink control information.

Aspect 12: A method for wireless communication at an access network entity, comprising: transmitting, to a UE, an uplink grant with a set of uplink resources for an uplink data transmission from the UE to the access network entity, wherein the uplink data transmission is to be transmitted in a set of repetitions, and at least a subset of the set of repetitions include uplink control information; and receiving the set of repetitions in the set of uplink resources, wherein a first subset of the set of uplink resources includes the uplink control information and a second subset of the set of uplink resources includes the uplink data transmission, and the first subset of uplink resources is determined for each of one or more repetitions in the subset of repetitions based at least in part on an offset value associated with uplink control information transmissions and a scaling factor applied to the offset value, wherein an amount of resources in the first subset of uplink resources is determined based at least in part on the offset value as scaled by the scaling factor, and wherein the scaling factor is based at least in part on one or more parameters associated with the set of repetitions, the uplink control information, or any combinations thereof.

Aspect 13: The method of aspect 12, further comprising: signaling the offset value to the UE via downlink control information or in configuration signaling, wherein the offset value provides a spectral efficiency ratio of the uplink data transmission to the uplink control information, and the scaling factor provides a scaled spectral efficiency ratio of the uplink data transmission to the uplink control information that is based at least in part on the one or more parameters.

Aspect 14: The method of any of aspects 12 through 13, wherein the scaling factor is determined separately for each repetition in the subset of the set of repetitions.

Aspect 15: The method of any of aspects 12 through 14, wherein a first repetition of the subset of repetitions includes a first type of uplink control information and a second repetition of the subset of repetitions includes a second type of uplink control information, and wherein the scaling factor is determined separately for the first type of uplink control information and the second type of uplink control information.

Aspect 16: The method of any of aspects 12 through 15, wherein the scaling factor is based at least in part on a number of uplink data transmission repetitions in the set of repetitions, a quantity of uplink data transmission repetitions in the set of repetitions without uplink control information multiplexed therewith, or any combinations thereof.

Aspect 17: The method of any of aspects 12 through 16, wherein the scaling factor is based at least in part on a number of the subset of repetitions on which a particular uplink control information is multiplexed.

Aspect 18: The method of aspect 17, wherein the offset value is scaled by the scaling factor to provide a total number of resource elements across the subset of repetitions that is equal to a number of resource elements that would be used if the uplink control information were to be multiplexed with a single repetition of the uplink data transmission.

Aspect 19: The method of any of aspects 12 through 18, further comprising: configuring the UE with two or more uplink reference signal resource sets, and wherein the scaling factor is based at least in part on whether the subset of repetitions are associated with a single uplink reference signal resource set or multiple uplink reference signal resource sets.

Aspect 20: The method of any of aspects 12 through 19, wherein the scaling factor is based at least in part on a type of information included in the uplink control information.

Aspect 21: The method of aspect 20, wherein the type of information included in the uplink control information includes one or more of periodic CSI, aperiodic CSI, semi-persistent CSI, acknowledgment/negative-acknowledgment feedback information, or any combinations thereof.

Aspect 22: The method of any of aspects 12 through 21, wherein the scaling factor is based at least in part on a reliability target associated with the uplink control information.

Aspect 23: An apparatus for wireless communication at a UE, comprising at least one processor; memory coupled with the at least one processor; and instructions stored in the memory and executable by the at least one processor to cause the apparatus to perform a method of any of aspects 1 through 11.

Aspect 24: An apparatus for wireless communication at a UE, comprising at least one means for performing a method of any of aspects 1 through 11.

Aspect 25: A non-transitory computer-readable medium storing code for wireless communication at a UE, the code comprising instructions executable by a processor to perform a method of any of aspects 1 through 11.

Aspect 26: An apparatus for wireless communication at an access network entity, comprising at least one processor; memory coupled with the at least one processor; and instructions stored in the memory and executable by the at least one processor to cause the apparatus to perform a method of any of aspects 12 through 22.

Aspect 27: An apparatus for wireless communication at an access network entity, comprising at least one means for performing a method of any of aspects 12 through 22.

Aspect 28: A non-transitory computer-readable medium storing code for wireless communication at an access network entity, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, etc., whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
at least one processor;
memory coupled with the at least one processor; and
instructions stored in the memory and executable by the at least one processor to cause the apparatus to:
receive configuration information for two or more uplink reference signal resource sets;
receive an uplink grant with a set of uplink resources for an uplink data transmission from the UE, wherein the uplink data transmission is to be transmitted in a set of repetitions, and at least a subset of the set of repetitions include uplink control information that is multiplexed with the uplink data transmission; and
transmit the set of repetitions in the set of uplink resources, wherein a first subset of the set of uplink resources is for the uplink control information and a second subset of the set of uplink resources is for the uplink data transmission, and the first subset of uplink resources is determined for each of one or more repetitions in the subset of repetitions based at least in part on an offset value associated with uplink control information transmissions and a scaling factor applied to the offset value, wherein an amount of resources in the first subset of uplink resources is determined based at least in part on the offset value as scaled by the scaling factor, wherein the scaling factor is based at least in part on one or more parameters associated with the set of repetitions, the uplink control information, or any combinations thereof, and wherein the scaling factor is based at least in part on whether the subset of repetitions are associated with a single uplink reference signal resource set or multiple uplink reference signal resource sets.

2. The apparatus of claim 1, wherein the instructions are further executable by the at least one processor to cause the apparatus to:
receive the offset value in downlink control information or in configuration signaling, wherein the offset value provides a spectral efficiency ratio of the uplink data transmission to the uplink control information, and the scaling factor provides a scaled spectral efficiency ratio of the uplink data transmission to the uplink control information that is based at least in part on the one or more parameters.

3. The apparatus of claim 1, wherein the scaling factor is determined separately for each repetition in the subset of the set of repetitions.

4. The apparatus of claim 1, wherein a first repetition of the subset of repetitions includes a first type of uplink control information and a second repetition of the subset of repetitions includes a second type of uplink control information, and wherein the scaling factor is determined separately for the first type of uplink control information and the second type of uplink control information.

5. The apparatus of claim 1, wherein the scaling factor is based at least in part on a number of uplink data transmission repetitions in the set of repetitions, a quantity of uplink data transmission repetitions in the set of repetitions without uplink control information multiplexed therewith, or any combinations thereof.

6. The apparatus of claim 1, wherein the scaling factor is based at least in part on a number of the subset of repetitions on which a particular uplink control information is multiplexed.

7. The apparatus of claim 6, wherein the offset value is scaled by the scaling factor to provide a total number of resource elements across the subset of repetitions that is equal to a number of resource elements that would be used if the uplink control information were to be multiplexed with a single repetition of the uplink data transmission.

8. The apparatus of claim 1, wherein the scaling factor is based at least in part on a type of information included in the uplink control information.

9. The apparatus of claim 8, wherein the type of information included in the uplink control information includes one or more of periodic channel state information (CSI), aperiodic CSI, semi-persistent CSI, acknowledgment/negative-acknowledgment feedback information, or any combinations thereof.

10. The apparatus of claim 1, wherein the scaling factor is based at least in part on a reliability target associated with the uplink control information.

11. An apparatus for wireless communication at an access network entity, comprising:
at least one processor;
memory coupled with the at least one processor; and
instructions stored in the memory and executable by the at least one processor to cause the apparatus to:
configure a user equipment (UE) with two or more uplink reference signal resource sets;
transmit, to the UE, an uplink grant with a set of uplink resources for an uplink data transmission from the UE to the access network entity, wherein the uplink data transmission is to be transmitted in a set of repetitions, and at least a subset of the set of repetitions include uplink control information; and
receive the set of repetitions in the set of uplink resources, wherein a first subset of the set of uplink resources includes the uplink control information and a second subset of the set of uplink resources includes the uplink data transmission, and the first subset of uplink resources is determined for each of one or more repetitions in the subset of repetitions based at least in part on an offset value associated with uplink control information transmissions and a scaling factor applied to the offset value, wherein an amount of resources in the first subset of uplink resources is determined based at least in part on the offset value as scaled by the scaling factor, wherein the scaling factor is based at least in part on one or more parameters associated with the set of repetitions, the uplink control information, or any combinations thereof, and wherein the scaling factor is based at least in part on whether the subset of repetitions are associated with a single uplink reference signal resource set or multiple uplink reference signal resource sets.

12. The apparatus of claim 11, wherein the instructions are further executable by the at least one processor to cause the apparatus to:
signal the offset value to the UE via downlink control information or in configuration signaling, wherein the offset value provides a spectral efficiency ratio of the uplink data transmission to the uplink control information, and the scaling factor provides a scaled spectral efficiency ratio of the uplink data transmission to the uplink control information that is based at least in part on the one or more parameters.

13. The apparatus of claim 11, wherein the scaling factor is determined separately for each repetition in the subset of the set of repetitions.

14. The apparatus of claim 11, wherein a first repetition of the subset of repetitions includes a first type of uplink control information and a second repetition of the subset of repetitions includes a second type of uplink control information, and wherein the scaling factor is determined separately for the first type of uplink control information and the second type of uplink control information.

15. The apparatus of claim 11, wherein the scaling factor is based at least in part on a number of uplink data transmission repetitions in the set of repetitions, a quantity of uplink data transmission repetitions in the set of repetitions without uplink control information multiplexed therewith, or any combinations thereof.

16. The apparatus of claim 11, wherein the scaling factor is based at least in part on a number of the subset of repetitions on which a particular uplink control information is multiplexed.

17. The apparatus of claim 16, wherein the offset value is scaled by the scaling factor to provide a total number of resource elements across the subset of repetitions that is equal to a number of resource elements that would be used if the uplink control information were to be multiplexed with a single repetition of the uplink data transmission.

18. The apparatus of claim 11, wherein the scaling factor is based at least in part on a type of information included in the uplink control information.

19. The apparatus of claim 18, wherein the type of information included in the uplink control information includes one or more of periodic channel state information (CSI), aperiodic CSI, semi-persistent CSI, acknowledgment/negative-acknowledgment feedback information, or any combinations thereof.

20. The apparatus of claim 11, wherein the scaling factor is based at least in part on a reliability target associated with the uplink control information.

21. A method for wireless communication at a user equipment (UE), comprising:
receiving configuration information for two or more uplink reference signal resource sets;
receiving an uplink grant with a set of uplink resources for an uplink data transmission from the UE, wherein the uplink data transmission is to be transmitted in a set of repetitions, and at least a subset of the set of repetitions include uplink control information that is multiplexed with the uplink data transmission; and
transmitting the set of repetitions in the set of uplink resources, wherein a first subset of the set of uplink resources is for the uplink control information and a second subset of the set of uplink resources is for the uplink data transmission, and the first subset of uplink resources is determined for each of one or more repetitions in the subset of repetitions based at least in part on an offset value associated with uplink control information transmissions and a scaling factor applied to the offset value, wherein an amount of resources in the first subset of uplink resources is determined based at least in part on the offset value as scaled by the scaling factor, wherein the scaling factor is based at least in part on one or more parameters associated with the set of repetitions, the uplink control information, or any combinations thereof, and wherein the scaling factor is based at least in part on whether the subset of repetitions are associated with a single uplink reference signal resource set or multiple uplink reference signal resource sets.

22. The method of claim 21, further comprising:
receiving the offset value in downlink control information or in configuration signaling, wherein the offset value provides a spectral efficiency ratio of the uplink data transmission to the uplink control information, and the scaling factor provides a scaled spectral efficiency ratio of the uplink data transmission to the uplink control information that is based at least in part on the one or more parameters.

23. The method of claim 21, wherein the scaling factor is determined separately for each repetition in the subset of the set of repetitions.

24. The method of claim 21, wherein a first repetition of the subset of repetitions includes a first type of uplink control information and a second repetition of the subset of repetitions includes a second type of uplink control information, and wherein the scaling factor is determined separately for the first type of uplink control information and the second type of uplink control information.

25. A method for wireless communication at an access network entity, comprising:
configuring a user equipment (UE) with two or more uplink reference signal resource sets;
transmitting, to the UE, an uplink grant with a set of uplink resources for an uplink data transmission from the UE to the access network entity, wherein the uplink data transmission is to be transmitted in a set of repetitions, and at least a subset of the set of repetitions include uplink control information; and
receiving the set of repetitions in the set of uplink resources, wherein a first subset of the set of uplink resources includes the uplink control information and a second subset of the set of uplink resources includes the uplink data transmission, and the first subset of uplink resources is determined for each of one or more repetitions in the subset of repetitions based at least in part on an offset value associated with uplink control information transmissions and a scaling factor applied to the offset value, wherein an amount of resources in the first subset of uplink resources is determined based at least in part on the offset value as scaled by the scaling factor, wherein the scaling factor is based at least in part on one or more parameters associated with the set of repetitions, the uplink control information, or any combinations thereof, and wherein the scaling factor is based at least in part on whether the subset of repetitions are associated with a single uplink reference signal resource set or multiple uplink reference signal resource sets.

26. The method of claim 25, further comprising:
signaling the offset value to the UE via downlink control information or in configuration signaling, wherein the offset value provides a spectral efficiency ratio of the uplink data transmission to the uplink control information, and the scaling factor provides a scaled spectral efficiency ratio of the uplink data transmission to the uplink control information that is based at least in part on the one or more parameters.

27. The method of claim 25, wherein the scaling factor is determined separately for each repetition in the subset of the set of repetitions.

28. The method of claim 25, wherein a first repetition of the subset of repetitions includes a first type of uplink control information and a second repetition of the subset of repetitions includes a second type of uplink control information, and wherein the scaling factor is determined separately for the first type of uplink control information and the second type of uplink control information.

* * * * *